(12) United States Patent
Kikuzuki et al.

(10) Patent No.: US 10,070,439 B2
(45) Date of Patent: Sep. 4, 2018

(54) APPARATUS AND METHOD FOR MANAGING ASSIGNMENT OF TIME SLOTS

(71) Applicant: FUJITSU LIMITED, Kawasaki-shi, Kanagawa (JP)

(72) Inventors: Tatsuya Kikuzuki, Sodegaura (JP); Shuhei Ohsako, Itoshima (JP)

(73) Assignee: FUJITSU LIMITED, Kawasaki (JP)

( * ) Notice: Subject to any disclaimer, the term of this patent is extended or adjusted under 35 U.S.C. 154(b) by 12 days.

(21) Appl. No.: 15/445,177

(22) Filed: Feb. 28, 2017

(65) Prior Publication Data
US 2017/0265188 A1    Sep. 14, 2017

(30) Foreign Application Priority Data

Mar. 8, 2016   (JP) ................................ 2016-044445

(51) Int. Cl.
*H04W 72/00* (2009.01)
*H04W 72/04* (2009.01)
*H04J 3/16* (2006.01)

(52) U.S. Cl.
CPC ....... *H04W 72/0446* (2013.01); *H04J 3/1694* (2013.01)

(58) Field of Classification Search
CPC . H04W 72/0446; H04W 74/04; H04J 3/1694; H04J 3/1647
See application file for complete search history.

(56) References Cited

U.S. PATENT DOCUMENTS

| 2003/0199272 | A1  | 10/2003 | Shvodian et al. |
| 2007/0280153 | A1* | 12/2007 | Sinha ................... H04W 16/12 370/328 |
| 2012/0026989 | A1* | 2/2012  | Barghi ................. H04L 1/0668 370/336 |

FOREIGN PATENT DOCUMENTS

| JP | 2002-152124 | 5/2002 |
| JP | 2005-528014 | 9/2005 |
| JP | 2008-187463 | 8/2008 |
| JP | 2008-271376 | 11/2008 |

* cited by examiner

*Primary Examiner* — Ian N Moore
*Assistant Examiner* — Ronald H Davis
(74) *Attorney, Agent, or Firm* — Staas & Halsey LLP

(57) ABSTRACT

An apparatus for assigning time slots refers to a hierarchical structure when a predetermined number of time slots in one of a plurality of communication cycles is assigned to a communication apparatus, identifies an associated frame whose use status is to be changed to used by the assignment of the predetermined number of time slots for a group managed in a layer corresponding to the requested communication cycle, and makes determination to assign a frame belonging to a group in which a number of time slots, in the associated frame, whose use status is changed to used is smaller, to the communication apparatus.

4 Claims, 21 Drawing Sheets

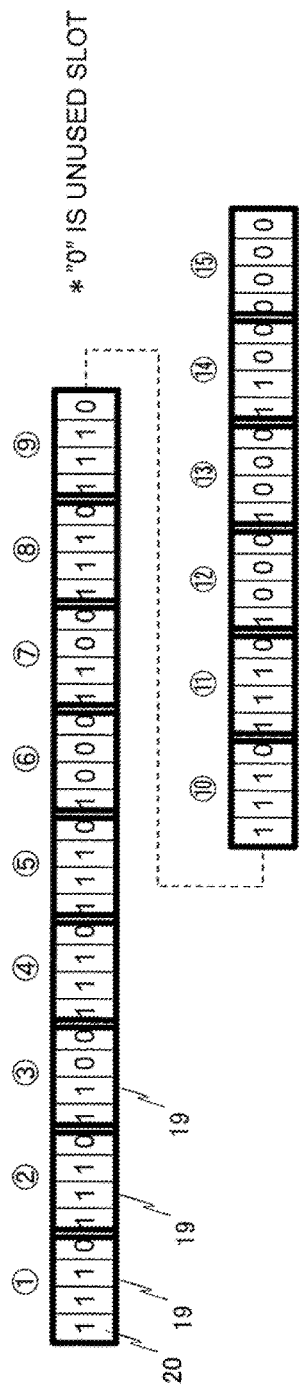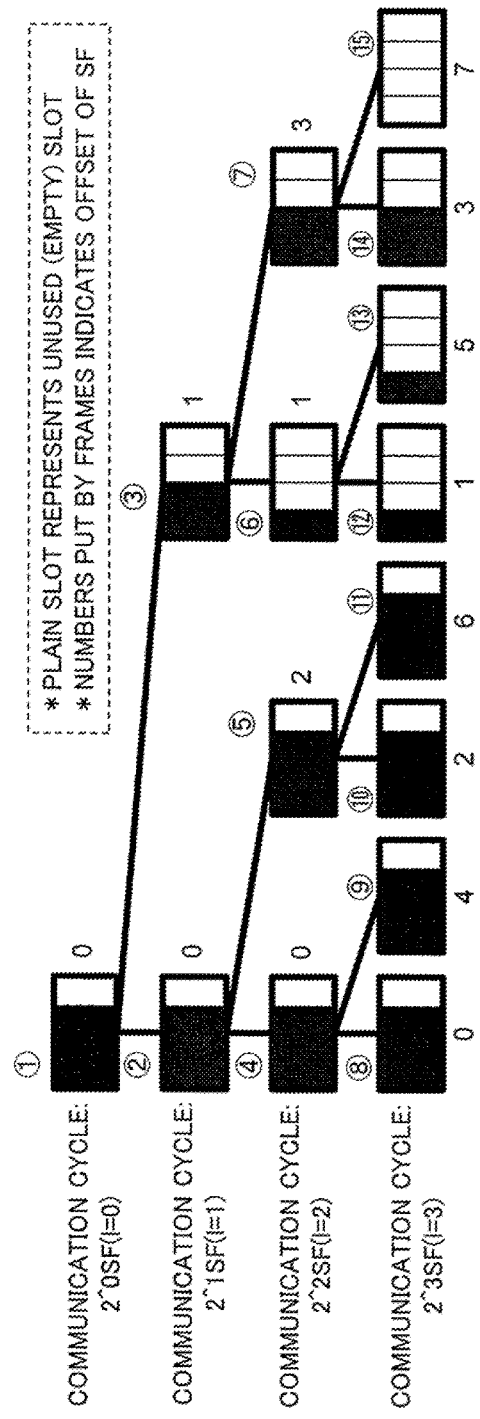
FIG. 20

APPARATUS AND METHOD FOR MANAGING ASSIGNMENT OF TIME SLOTS

CROSS-REFERENCE TO RELATED APPLICATION

This application is based upon and claims the benefit of priority of the prior Japanese Application No. 2016-044445 filed on Mar. 8, 2016, the entire contents of which are incorporated herein by reference.

FIELD

The present invention relates to an apparatus and a method for managing assignment method.

BACKGROUND

In the Internet of Things (IoT) field, development in various fields such as goods management using machine to machine (M2M) and healthcare using a body area network (BAN) has been expected.

Time division multiple access (TDMA) is one of communication methods that may be used in IoT. For example, there is a network in which a wireless base station (called a "hub") performs wireless communication with a plurality of wireless terminals (called "nodes") using TDMA. In the description below, a wireless base station is simply indicated as "base station", and a wireless terminal is simply indicated as "terminal".

In TDMA, time is divided in units of a predetermined time length called frames, and each frame is further divided in units of time of a predetermined length (called "time slots"). The base station assigns time slots to the respective terminals. Each terminal transmits information to the base station using the time slots assigned to the terminal. Consequently, even if a same frequency bandwidth is shared between the terminals, each terminal can transmit information to the base station with no interference.

The base station manages the frames and the time slots, and in response to a connection request from each terminal, searches for time slots in an empty state (empty slots) and assigns the time slots. Here, a bandwidth the terminal desires to use in communication is expressed by the number of time slots the terminal desires to use.

In empty slot assignment, if the communication cycles and the bandwidths (time slot counts) the terminals desire to use are the same, the base station can assign arbitrary empty slots to the respective terminals. A communication cycle is, for example, a cycle of transmission of information by a terminal.

For further information, see Japanese Laid-Open Patent Publication No. 2008-187463, Japanese Laid-Open Patent Publication No. 2008-271376, Japanese National Publication of International Patent Application No. 2005-528014, and Japanese Laid-Open Patent Publication No. 2002-152124.

SUMMARY

One of aspects is an assignment management apparatus. The assignment management apparatus assigns a time slot in a frame corresponding to any of a plurality of communication cycles, for communication for a communication apparatus, the frame being included in frames resulting from division of time, the frames each having a predetermined length and each being divided into a plurality of time slots each having a predetermined length.

The assignment management apparatus includes a memory and a processor configured to perform a process by executing a program stored in the memory, the process includes managing a management unit that manages a plurality of frames in the hierarchical structure below:

(i) including layers corresponding to a plurality of communication cycles each being a power of an integer k, (ii) in each layer, one or more frames that can be selected from the plurality of frames according to a communication cycle corresponding to the layer are grouped, one frame in each group is managed, and a use status of a time slot in the one frame is managed, and (iii) if a frame managed in a certain layer is managed in a layer other than the certain layer and if a frame belonging to a group to which a frame managed in the certain layer belongs managed in a layer other than the certain layer, the frame managed in the layer other than the certain layer is associated with the frame in the certain layer as an associated frame.

The process further includes, when a predetermined number of time slots in one of the plurality of communication cycles is assigned to the communication apparatus in response to a request, referring to the hierarchical structure, identifying an associated frame whose use status is to be changed to used by the assignment of the predetermined number of time slots for a group managed in a layer corresponding to the requested communication cycle, and making determination to assign a frame belonging to a group in which a number of time slots, in the associated frame, whose use status is changed to used is smaller, to the communication apparatus.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF THE DRAWINGS

FIG. 20 is an example configuration of a hierarchical structure managed by a bandwidth management unit.

DETAILED DESCRIPTION OF EMBODIMENT

An embodiment of an apparatus for allocating time slots and an embodiment of a method of allocating time slots will be described below with reference to the drawings. A configuration of the embodiment is a mere example, and the present invention is not limited to the configuration of the embodiment.

In assignment of empty slots to terminals, it is conceivable that efficient assignment of time slots to increase the number of terminals connected to a base station by efficient assignment of time slots. However, currently, there is no criterion for efficiently assigning time slots to terminals where the communication cycle and the use bandwidth (number of time slots requested to use) are different among the terminals. An object of the embodiment is to provide an apparatus and a method for allocating time slots to increase the number of communication apparatuses connected.

<Network Configuration>

Figure 1:
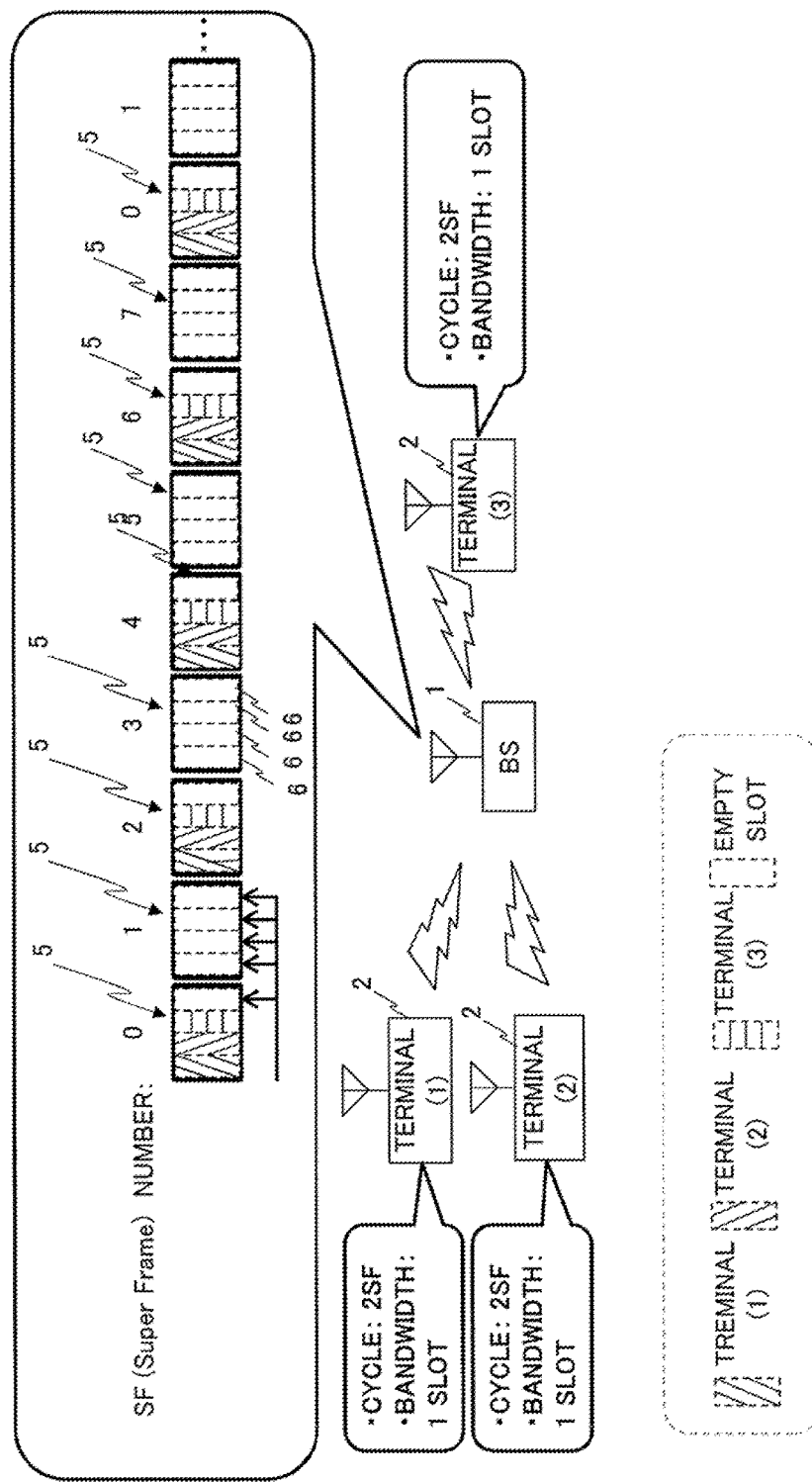
FIG. 1 illustrates an example of a wireless network system according to an embodiment.

FIG. 1 illustrates an example of a wireless network system according to an embodiment. In FIG. 1, the wireless network system includes a wireless base station (hereinafter referred to as "base station") 1, and a plurality of wireless terminals (hereinafter referred to as "terminals") 2. The base station 1 is an example of "wireless communication apparatus", and the terminals 2 are examples of "terminal" or "communication apparatus".

Each terminal 2 transmits information to (performs wireless communication with) the base station 1 using time slots assigned from the base station 1 by means of TDMA. As illustrated in FIG. 1, In TDMA, time (wireless channel) is divided into frames 5 each having a predetermined length of time. Each frame 5 is further divided into a plurality of time slots (TS) 6 each having a fixed time length.

A wireless communication standard adopted for the embodiment is, for example, IEEE0802.15.4 or IEEE0802.15.6. However, the wireless communication standard is not limited to these examples. In these standards, a frame 5 is called superframe (SF). However, in the description below, the term "frame" or "SF" is used. In the example in FIG. 1, one frame 5 is formed of four time slots 6. However, the number of time slots included in one frame can arbitrarily be set. A bandwidth to be assigned to a terminal 2 is determined according to the number of time slots 6 to be assigned.

Each terminal 2 transmits a connection request in which a communication cycle and a bandwidth are designated (bandwidth (time slot) assignment request) to the base station 1. The communication cycle indicates a cycle of transmission of information by the terminal 2, and is expressed by an interval of frames 5 via which information is transmitted from the terminal 2. The bandwidth indicates a desired number of time slots 6 to be assigned. For example, a communication cycle of "2 SF" indicates that the terminal 2 performs information transmission (communication) every two frames, and a time slot 6 in each of frames 5 matching the communication cycle is assigned to the terminal 2. Also, where the bandwidth is "1 slot", one time slot 6 is assigned from one frame.

In the example illustrated in FIG. 1, each of the terminals 2 (terminals (1) to (3)) requests "2 SF" and "1 slot". The base station 1 assigns one time slot to the terminal (1) every two frames (frame numbers 0, 2, 4, 6, . . . ). A first time slot 6 from the left in each of the frames is assigned to the terminal (1).

The base station 1 assigns one time slot to the terminal (2) every two frames (frame numbers 0, 2, 4, 6, . . . ). A second time slot 6 from the left in each of the frames 5 is assigned to the terminal (2). Also, the base station 1 assigns one time slot to the terminal (3) every two frames (frame numbers 0, 2, 4, 6, . . . ). A third time slot 6 in each of the frames 5 is assigned to the terminal (3).

In the example in FIG. 1, eight frames 5 with respective frame numbers of "0" to "7" provided thereto form one set, and such one set is repeated. In other words, the frame number "0" comes next to the frame number "7". The frame numbers are each used as information indicating an offset position in one set.

Figure 2:
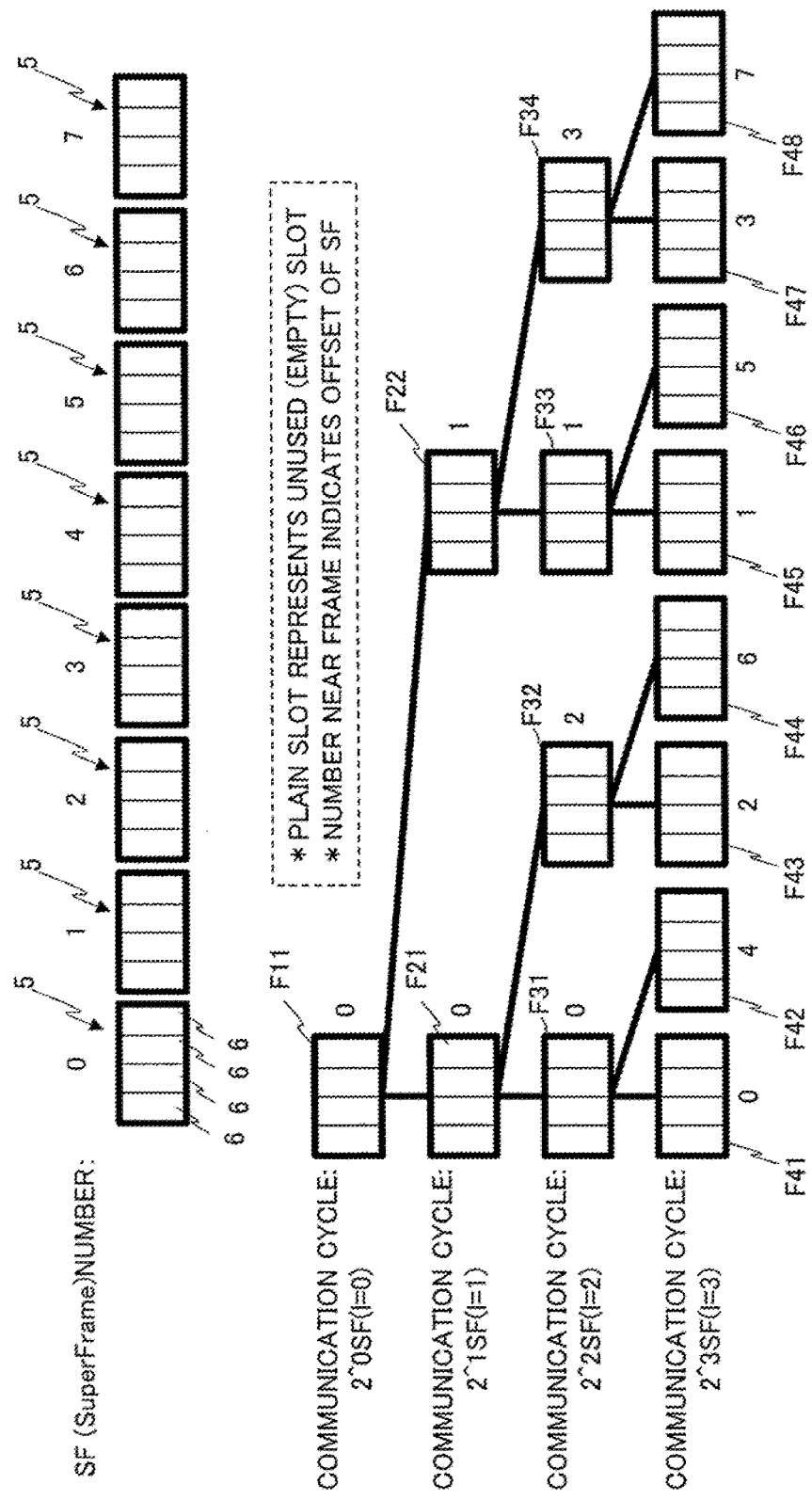
FIG. 2 is a diagram of a time slot assignment status management method according to an embodiment.

FIG. 2 is a diagram illustrating a time slot assignment status management method according to an embodiment. The upper part of FIG. 2 provides a diagram of a plurality of frames used in the embodiment. The lower part of FIG. 2 indicates an example of a hierarchical structure of frames managed in the embodiment. The hierarchical structure is used for managing a status of time slot assignment to terminals according to respective communication cycles.

In the embodiment, a communication cycle is indicated as k^l (power of k), and bandwidth assignments whose communication cycle and SFs to be used are the same are grouped. Each of k and l is an integer. However, it is preferable that an integer of no less than 2 is employed as a value of k.

In the embodiment, as "bandwidth management", the respective groups are managed with the number of indices 1 (that is, the number of communication cycles) as layers. Also, as bandwidth management, bandwidth management between an l-1 layer and an l layer is performed such a manner that groups whose bandwidths to be used overlap each other are linked. Also, in the embodiment, as "bandwidth registration", bandwidth registration is performed in such a manner that a communication cycle and a bandwidth in use and a corresponding bandwidth in a group linked with the relevant group are registered as "used" in an OR condition. Then, in the embodiment, as "bandwidth assignment", bandwidths in a group in which the number of bandwidths to be registered as "used" is smaller are assigned to subordinate terminals.

For the plurality of frames, the following hierarchical structure is managed:
(i) including layers corresponding to a plurality of communication cycles each being a power of the integer k (k^l);
(ii) in each layer, one or more frames that can be selected from the plurality of frames according to the communication cycle corresponding to the layer are grouped, one frame in each group (for example, a top frame in each group) is managed, and a use status of time slots in the one frame is managed; and (iii) if a frame managed in a certain layer is managed in a layer other than the certain layer and a frame belonging to a group to which a frame managed in the certain layer belongs managed in a layer other than the certain layer, the following is performed. In other words, the frame managed in a layer other than the certain layer is associated with the frame in the certain layer as an associated frame.

A more specific description will be provided. In the embodiment, a communication cycle of each terminal 2 is defined as an l-th power of k (power of k: k^l). In the embodiment, an example in which k=2 and l=3 (l=0, 1, 2, 3) will be described. In this example, a plurality of communication cycles that can be employed for the terminals 2 are four communication cycles that are $2^0$ (=1), $2^1$ (=2), $2^2$ (=4) and $2^3$ (=8), and any of these communication cycles is set according to a request from each terminal 2.

As illustrated in the upper part of FIG. 2, in the embodiment, a largest value of the communication cycles is $2^3$=8 [SFs]. One set of a plurality of frames can be determined based on the largest value of the communication cycles. For example, if the largest value is 8 SFs, eight frames with respective frame numbers "0" to "7" provided thereto are determined as one set. The plurality of frames 5 can be defined as repetitions of the one set of frames. The one set of frames 5 is an example of "plurality of frames".

For example, if the largest value of the communication cycles is 2^4=16, one set can be determined as frames 5 having respective frame numbers "0" to "15". If the largest value is 2^2=4, one set can be determined as frames 5 having respective frame numbers "0" to "3". However, the number of frames 5 forming one set may be larger than the largest value (largest cycle) of the communication cycles.

The number of layers in the hierarchical structure is a number corresponding to the number of communication cycles that may be employed (0, 1, 2, 3) (four layers in the example in FIG. 2). In each layer, a top (offset) frame 5 from among frames 5 belonging to a group formed for each selection pattern of time slots according to the corresponding communication cycle is set. The frames 5 set in each layer each have flag areas for respective time slots, in which information (flag) indicating either one of "unused" and "used". Consequently, a use status of the time slots is managed.

The frames selected according to each selection pattern are an example of "one or more frames that can be selected from the plurality of frames according to a communication cycle corresponding to the layer", and the top frame is an example of "one frame in each group". As the one frame, a frame other than the top (offset) may be employed. For example, if the offsets are managed separately from the hierarchical structure, as a frame in each layer, a frame other than the offset can be employed.

For example, in the case of a communication cycle of $2^1$ SFs (l=1), a case where frames 5 in which a time slot 6 is to be assigned are selected from one set of frames 5 (frame numbers "0" to "7") according to the communication cycle=2 is assumed.

In this case, as frames 5 in which a time slot 6 is to be assigned, frames 5 of the frame numbers "0", "2", "4" and "6" can be selected from one set of frames 5. Also, frames 5 of the frame numbers "1", "3", "5" and "7" can be selected from one set of frames 5.

In other words, the frame numbers "0", "2", "4" and "6" may be selected as a selection pattern (referred to as "first selection pattern"). Also, the frame numbers "1", "3", "5" and "7" may be selected as a selection pattern (referred to as "second selection pattern"). In the embodiment, frames 5 selected in a selection pattern is set as one group, and a top frame 5 (offset) in each group is managed in each layer.

In the case of communication cycle of $2^1$ SFs (l=1), the first selection pattern of the frame numbers "0", "2", "4" and "6" and the second selection pattern of the frame numbers "1", "3", "5" and "7" can be determined. Then, frames 5 of the frame numbers "0" and "1", which are tops of the respective selection patterns (referred to as "frame F21" and "frame F22") are set in the layer of the communication cycle of $2^1$ SFs (l=1). A frame number in a top of each selection pattern is called "offset".

For the communication cycle of $2^1$ SFs (l=1), for example, the frame numbers "2", "4" and "6" and the frame numbers "3", "5" and "7" may be employed as selection patterns. However, in the embodiment, selection patterns are selected according to a rule that as many frames 5 as possible are assigned in one set of frames 1 (frames are selected in order from top).

As a result, the first and second selection patterns are selected and groups corresponding to these selection patterns are set. Then, as offsets of the respective groups, the frames 5 of the frame numbers "0" and "1" are managed in the layer corresponding to the communication cycle of $2^1$ SFs (l=1). However, a group of a selection pattern other than the first and second selection patterns may be managed.

In the layer of the communication cycle of $2^0$ SF (l=0), a time slot 6 is assigned every one frame. Thus, under the rule that as many frame as possible are assigned, a selection pattern for selecting the frame numbers "0" to "7" is selected, and the frames 5 selected in the selection pattern are grouped. Then, a frame 5 of the frame number "0" that is a top (offset) (referred to as "frame F11") in the group is set in the layer of the communication cycle $2^0$ SF (l=0).

In the layer of the communication cycle of $2^2$ SFs (l=2), a time slot 6 is assigned every four frames. Thus, under the aforementioned rule, there are four selection patterns, i.e., the frame numbers "0" and "4", the frame numbers "1" and "5", the frame numbers "2" and "6", and the frame numbers "3" and "7", and a group corresponding to each selection pattern is formed. Then, frames 5 of the frame numbers "0", "1", "2" and "3" that are tops (offsets) in the respective groups are set in the layer of the communication cycle of $2^2$ SFs (l=2). The frames 5 of the frame numbers "0", "1", "2" and "3" are referred to as frame F31, frame F32, frame F33 and frame F34, respectively.

In the layer of the communication cycle of $2^3$ SFs (l=3), a time slot 6 is assigned every eight frames. Thus, the number of frames 5 selected from one set is 1, and each of the frame numbers "0" to "7" forms one group and corresponds to a top (offset) of a selection pattern. Thus, the frames 5 of the frame numbers "0" to "7" (referred to as "frames F41 to F48") are set in the layer (lowermost layer) of the communication cycle of $2^3$ SFs (l=3).

Furthermore, if, for each of the groups inset in a certain layer, a frame 5 belonging to the same group to which a frame 5 belongs is present in any of layers other than the certain layer, the frames 5 are linked. The layers other than the certain layer includes layers adjacent to the certain layer (layers immediately above or below the layer: adjacent layers) and layers adjacent to the adjacent layers.

For example, assuming that the layer of the communication cycle of 2^1 SFs is a certain layer, the layer of the communication cycle of 2^0 SF and the layer of the communication cycle of 2^2 SFs are adjacent layers. In each of the adjacent layers, as a frame belonging to a group to which the frame number "0" (frame F21) set in the certain layer (communication cycle 2^1 SF), a frame 5 of the frame number "0" (the frame F11 or the frame F31) is set. Therefore, the frame F11 and the frame F21 are linked (associated), and the frame F21 and the frame F31 are linked (associated). For a reason similar to the above, the frame F31 in the layer of the communication cycle of 2^2 SFs, and the frame F41 in the layer of the communication cycle of 2^3 SFs are linked. The frame F11, the frames F31 and F32 and the frames F41 to F44 are examples of frames associated with the frame F21.

Also, focusing on the layer of the communication cycle of 2^1 SFs as the certain layer, the frame number "2" (frame F32) in the layer of the communication cycle of 2^2 SFs, which is a layer other than the certain layer, belongs to the group that is the same as the group to which the frame F21 belongs. Thus, the frame F21 and the frame F32 are linked. According to the above rules, the frame number "1" (frame F22) are lined with the frame F11, the frame F33 and the frame F34. Such linking as above is performed for each frame 5 in each layer.

For example, the frame number "0" (frame F31) in the communication cycle of 2^2 SFs are linked with the frame number "0" (frame F41) and the frame number "4" (frame F42) that belong to the same group (selection pattern) in the communication cycle of $2^3$ SFs. Also, the frame F31 is linked with the frame F21.

Also, the frame number "2" (frame F32) in the communication cycle of 2^2 SFs is linked with the frame number "2" (frame F43) and the frame number "6" (frame F44) that belong to the same group in the communication cycle of 2^3 SFs. Also, the frame F32 is linked with the frame F21.

Also, likewise, the frame F33 is linked with the frame F22, the frame F45 and the frame F46. Furthermore, the frame F34 is linked with the frame F22, the frame F47 and the frame F48. The hierarchical structure has a pyramid shape in which as the layer is lower, the number of nodes (frames) increases.

The base station 1 stores information on the above-described hierarchical structure in a storage device such as a memory. In response to a connection request from a terminal 2, the base station 1 refers to the information on the hierarchical structure and determines frames 5 and time slots 6 to be assigned to the terminal 2 so that efficient assignment of time slots 6 is performed (as many time slots 6 as possible are assigned to the terminal 2).

Figure 3:
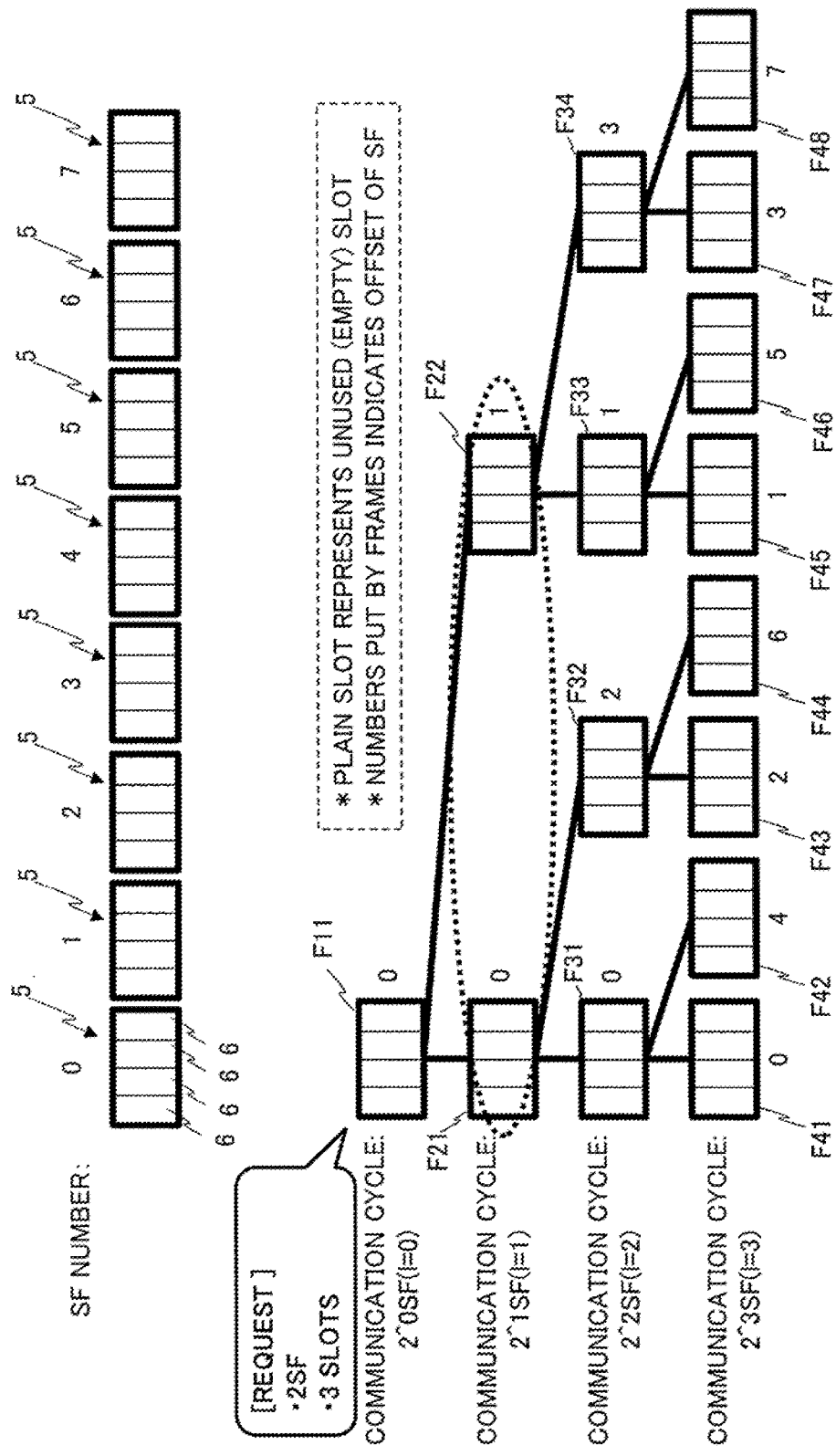
FIG. 3 is a diagram of a time slot assignment method using a hierarchical structure according to an embodiment.

FIGS. 3 to 15 are diagrams of a time slot assignment method using a hierarchical structure according to the embodiment. In FIG. 3, it is assumed that a terminal 2 (for example, the terminal (1)) transmits a connection request in which a communication cycle is "2 SFs" and a bandwidth is "3 slots" and the base station 1 receives the connection request.

The base station 1 performs processing for "bandwidth search". In this case, empty slots that are not set as "used" in the hierarchical structure can be used for assignment to the request source terminal 2.

Also, the base station 1 performs processing for "bandwidth assignment". This processing is performed for assigning a smaller number of slots registered as "used" from among the empty slots found in the bandwidth search to the request source terminal 2.

A specific description will be provided. The base station 1 reads the information on the hierarchical structure from the storage device. It is assumed that at this point of time, time slots 6 in all frames 5 forming the hierarchical structure (one set of frames 5) are unassigned.

Since the request from the terminal 2 indicates "2 SFs", that is, a communication cycle of 2^1 SFs (l=1), and frames 5 in the corresponding layer (frames F21 and F22) in the hierarchical structure is referred to. At this point of time, each of time slots 6 in the frame F21 and the frame F22 is empty.

Figure 4:
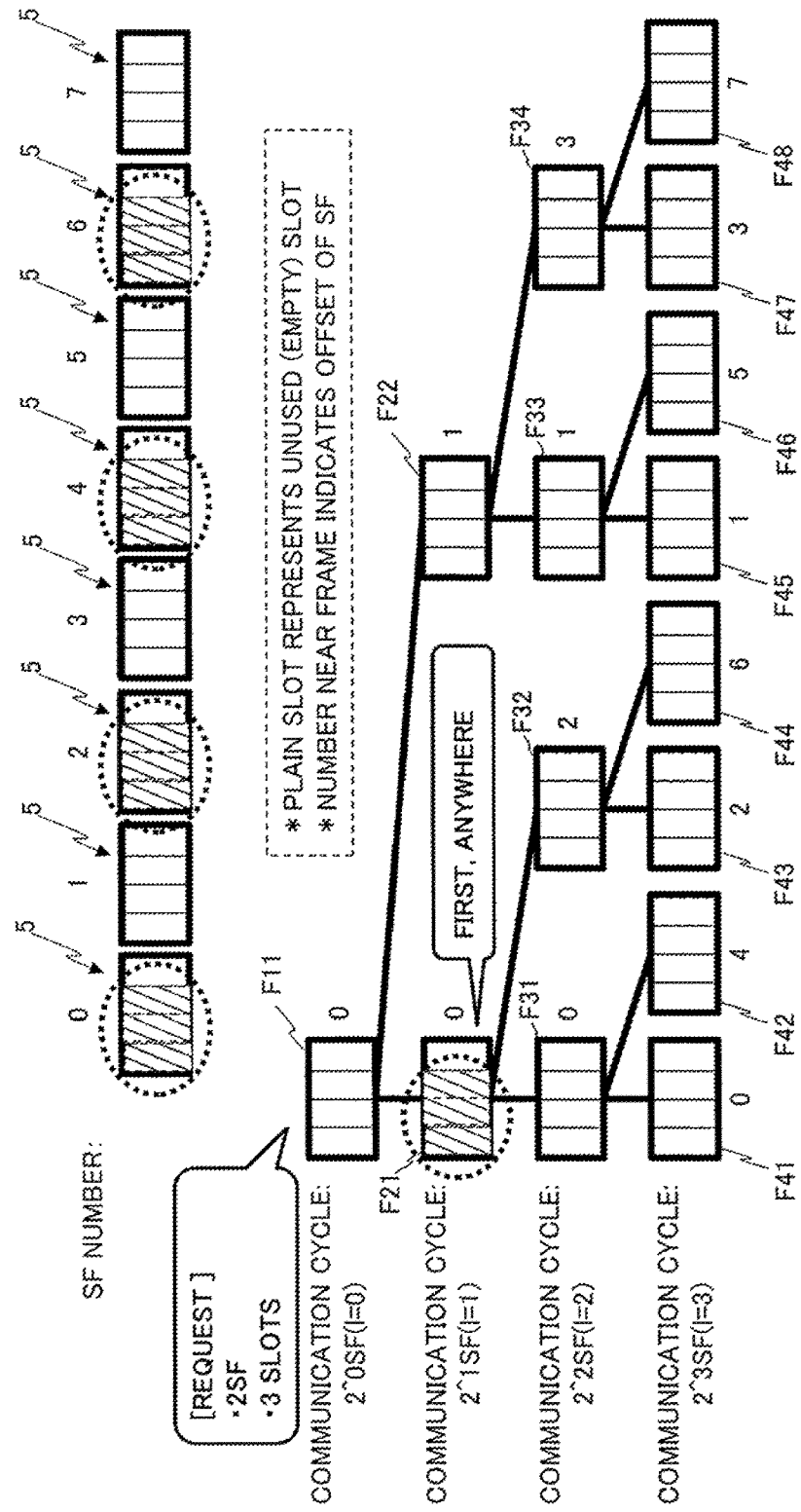
FIG. 4 is a diagram of a time slot assignment method using a hierarchical structure according to an embodiment.

As illustrated in FIG. 4, a case where the base station 1 selects, for example, the first selection pattern (respective frames 5 of the frame numbers "0", "2", "4" and "6") according to the rule that a selection pattern is selected in order from top is assumed. Furthermore, a case where it is determined that three empty slots from a top of each frame 5 in the first selection pattern are assigned to the terminal 2 is assumed.

Figure 5:
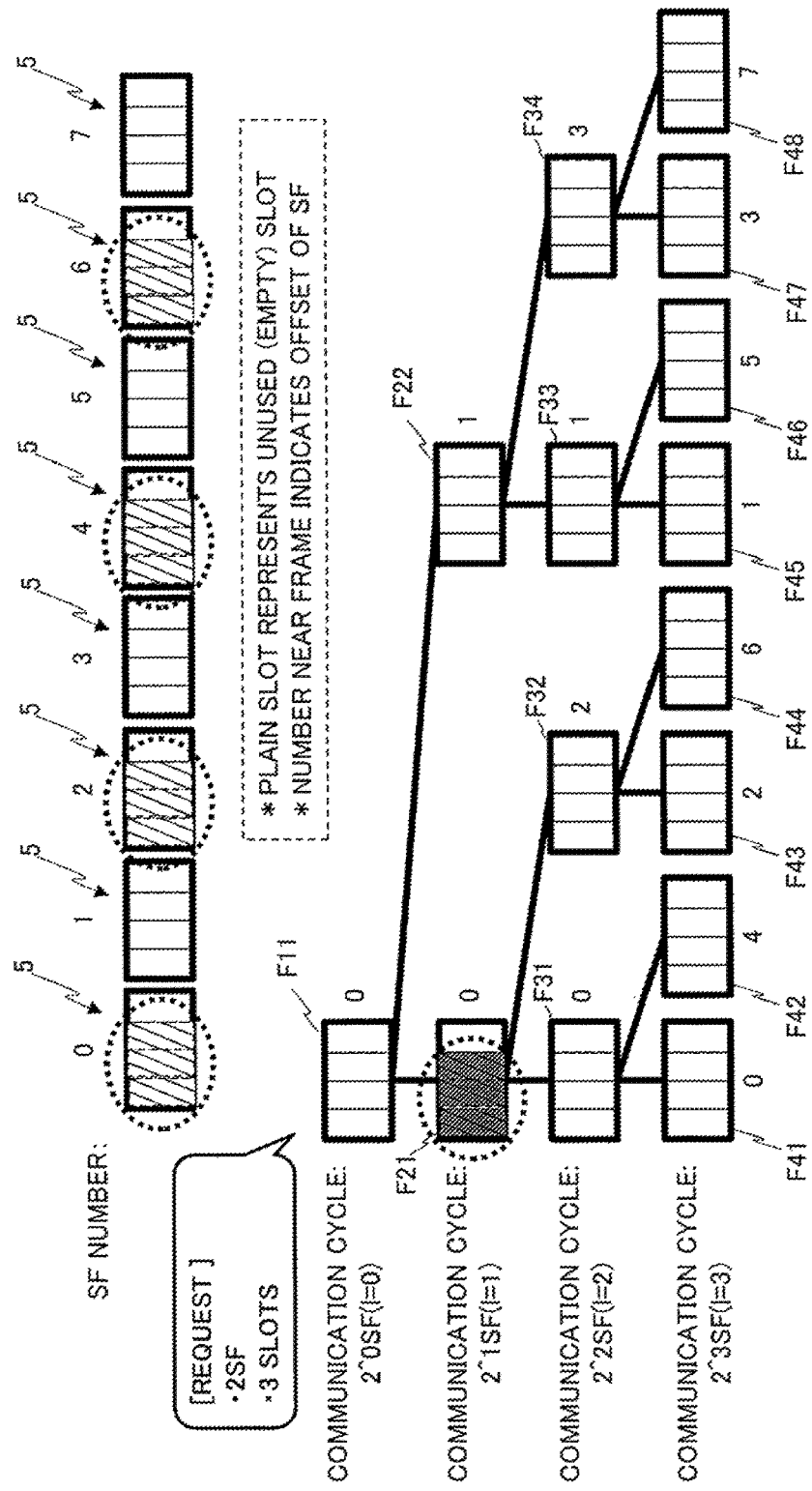
FIG. 5 is a diagram of a time slot assignment method using a hierarchical structure according to an embodiment.

In this case, the base station 1 sets and registers first to third time slots 6 in the frame number "0" (frame F21) in the relevant layer as "used" (see FIG. 5). Here, a selection pattern in which the frame number "1" (frame F22) is an offset instead of the frame number "0" (frame F21) may be selected.

Figure 6:
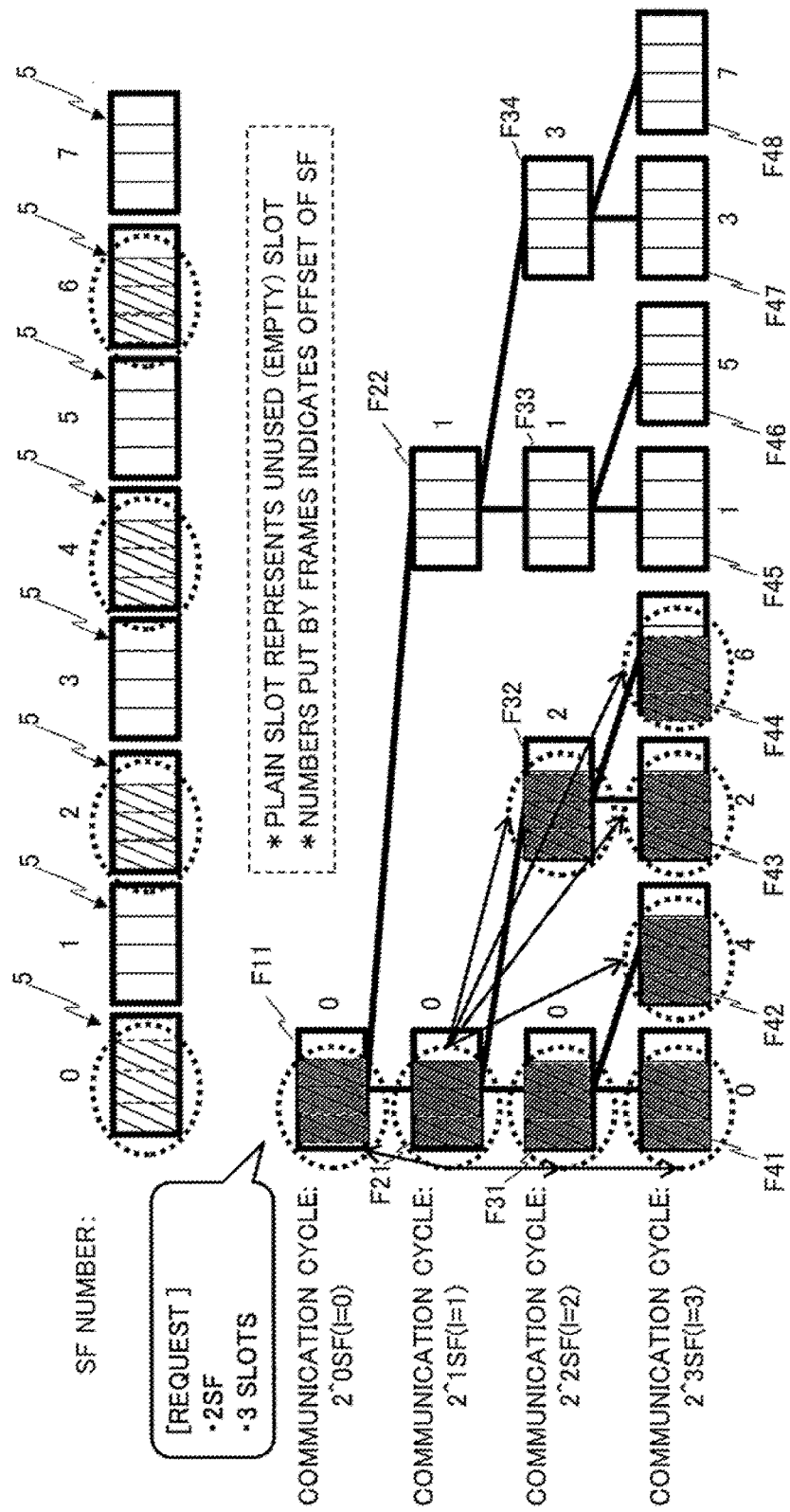
FIG. 6 is a diagram of a time slot assignment method using a hierarchical structure according to an embodiment.

The base station 1 performs processing for "bandwidth registration". As illustrated in FIG. 6, the base station 1 registers the frames 5 in the adjacent layers, the frames 5 being lined with the frame F21, as "used" based on an OR condition. In other words, the base station 1 registers time slots 6 that are the same as those for the frame F21 in each of the frame F11, the frame F31 and the frame F32 in the adjacent layers, which belong to the group the frame F21 belongs to, as "used". Relevant time slots 6 in frames 5 that belong to the group the frame F21 belongs to and are linked with the frames 5 in the adjacent layers, the frames 5 being linked with the frame F21, are also registered as "used".

In the example in FIG. 6, processing that is similar to that for the frame F21 is performed for the frame F41 and the frame F42 linked with the frame F31, and the frame F43 and the frame F44 linked with the frame F32. In other words, the first to third time slots 6 are registered as "used".

Figure 7:
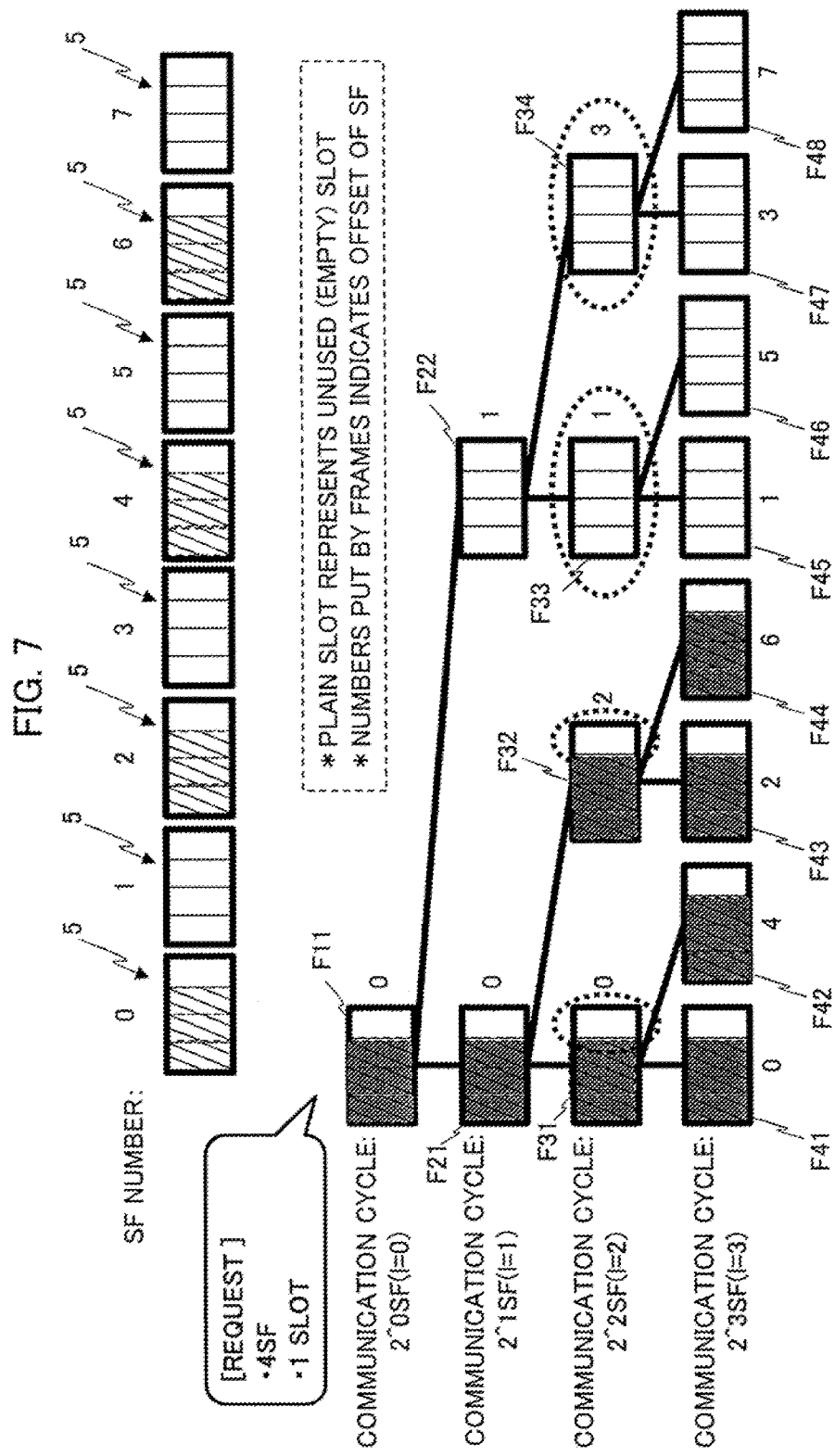
FIG. 7 is a diagram of a time slot assignment method using a hierarchical structure according to an embodiment.

As illustrated in FIG. 7, it is assumed that the base station 1 has received a connection request in which a communication cycle is 4 SFs and a bandwidth is 1 slot from a certain terminal 2 (for example, the terminal (2)). In this case, as a selection pattern in the layer corresponding to the requested communication cycle of 2^2 SFs, any of a plurality of selection patterns with frames F31 to F34 as respective offsets can be selected (see areas each surrounded by a dashed line in FIG. 7).

Figure 8:
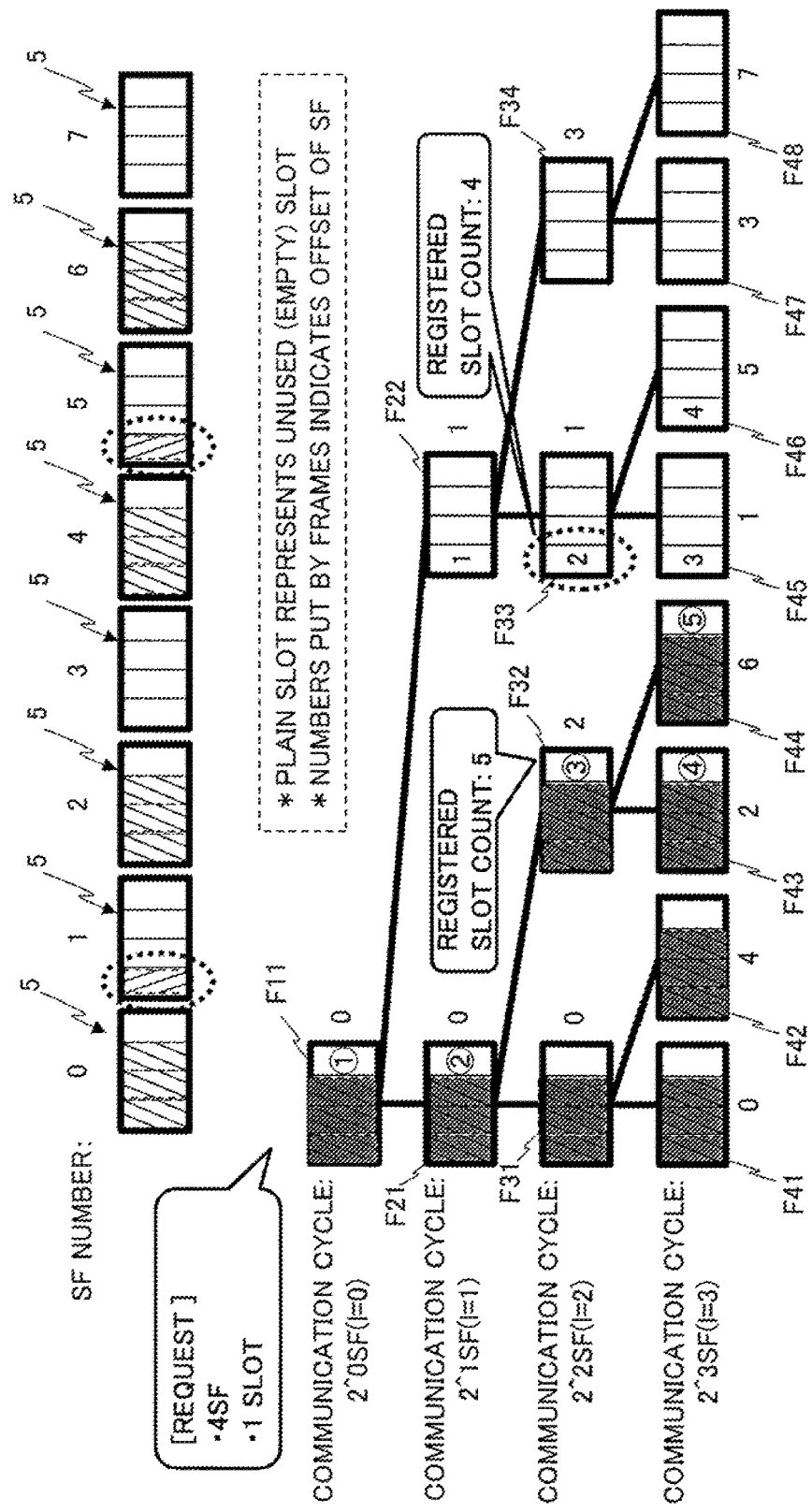
FIG. 8 is a diagram of a time slot assignment method using a hierarchical structure according to an embodiment.

Here, as illustrated in FIG. 8, a selection pattern (group) is determined (selected) so that the number of time slots 6 set as "used" as a result of assignment is smaller. For example, frames associated with the frame F32 where assignment of a fourth time slot 6 in the frame F32 is assumed are the frame F11, the frame F21, the frame F43 and the frame F44. Then, the number of time slots to be registered as "used" is five (four for the associated frames) as indicated by the circled numbers in FIG. 8.

On the other hand, frames associated with the frame F33 where assignment of a first time slot 6 in the frame F33 is assumed are the frame F11, the frame F22, the frame F45 and the frame F46. However, since the first time slot in the frame F11 is already used, the number of time slots registered to be as "used" this time are four (three for the associated frames) (see the numbers in the frames F22, F33, F45 and F46).

Figure 9:
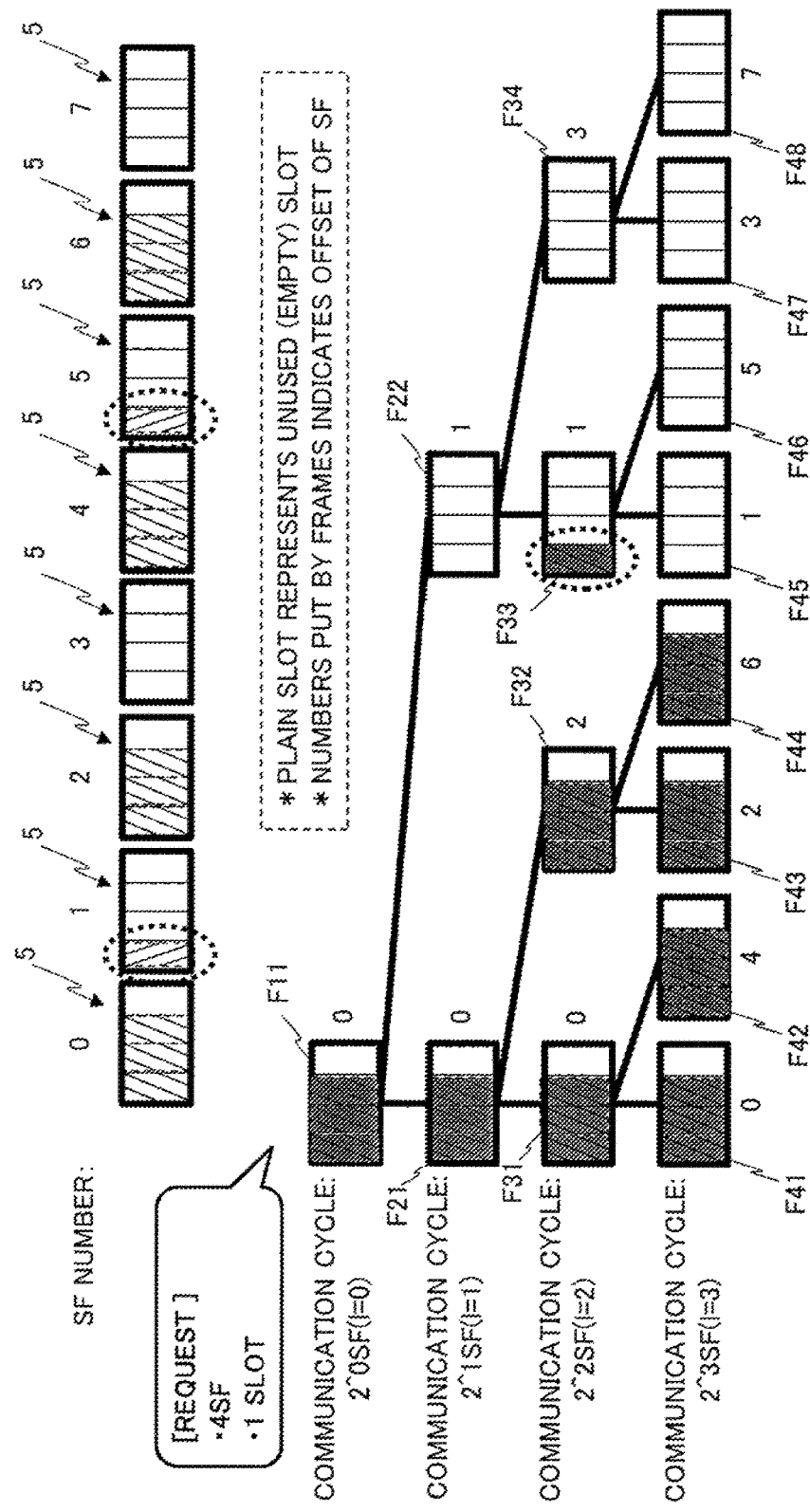
FIG. 9 is a diagram of a time slot assignment method using a hierarchical structure according to an embodiment.

In this case, as illustrated in FIG. 9, the base station 1 makes determination to select the frame number "1" (frame F33) for which the number of time slots in the associated frames to be registered as used is smaller than that for the frame number "2" (frame F32). Consequently, the number of time slots 6 to be registered as "used" can be reduced, which enables leaving room for an increase in number of terminals 2 connected to the base station 1.

As described above, the embodiment performs the following operation. In other words, when a predetermined number of time slots are assigned to a communication apparatus in one of the plurality of communication cycles in response to a request, the hierarchical structure is referred to. Also, for each of the groups managed in the layer corresponding to the requested communication cycle, the associated frames whose use status is to be changed to used upon assignment of the predetermined number of time slots are identified. Furthermore, determination is made to assign frames belonging to a group in which the number of time slots, in the associated frames, whose use status is to be changed to used is smaller, to the communication apparatus.

Figure 10:
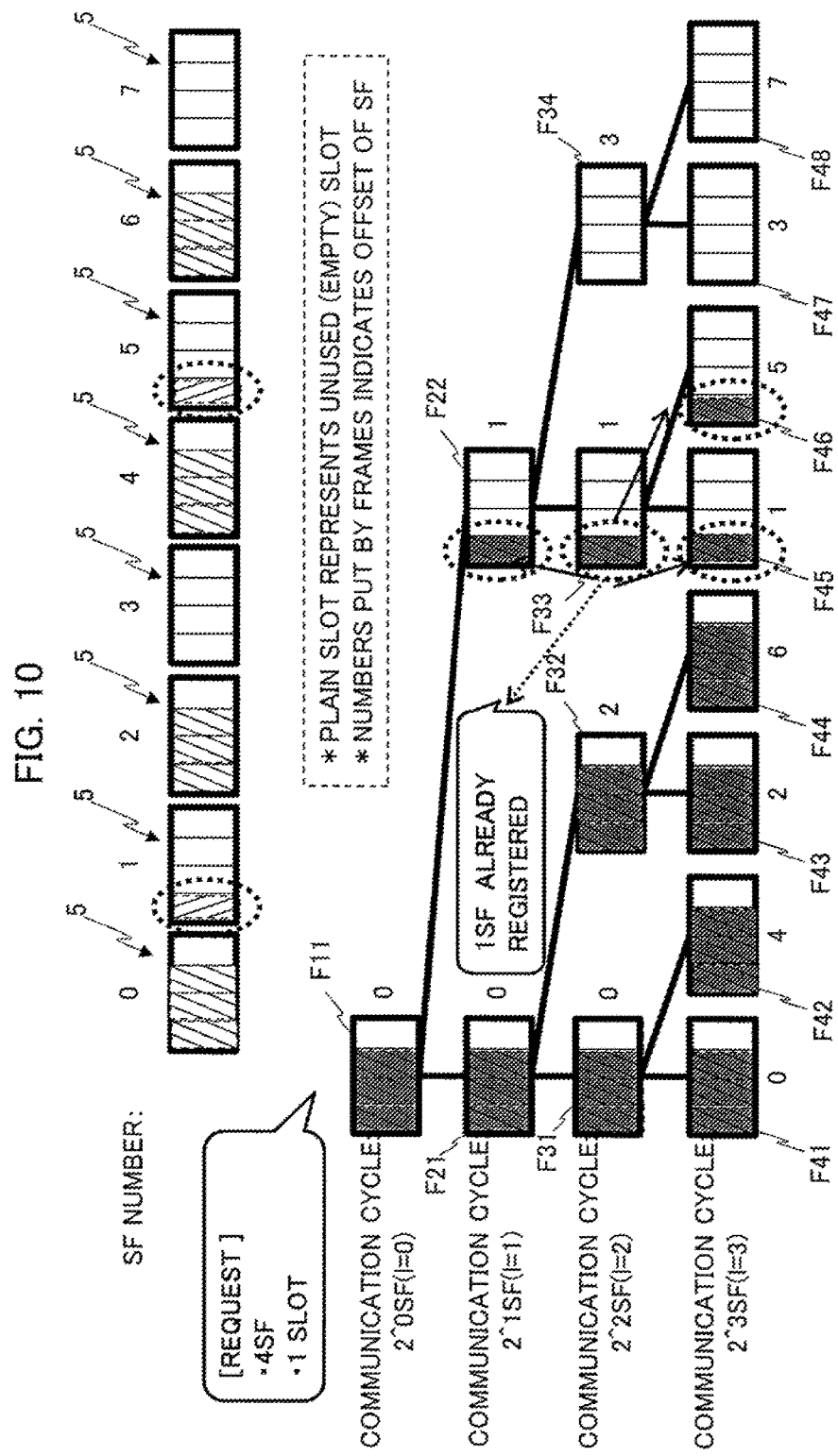
FIG. 10 is a diagram of a time slot assignment method using a hierarchical structure according to an embodiment.

As illustrated in FIG. 10, for each of the frame F22, the frame F45 and the frame F46 lined with the frame F33, a time slot 6 that is the same as that in the frame F33 (first time slot 6) is registered as "used". Here, since the first time slot 6 in the frame F11 is already used, no specific processing is performed for the time slot 6.

Figure 11:
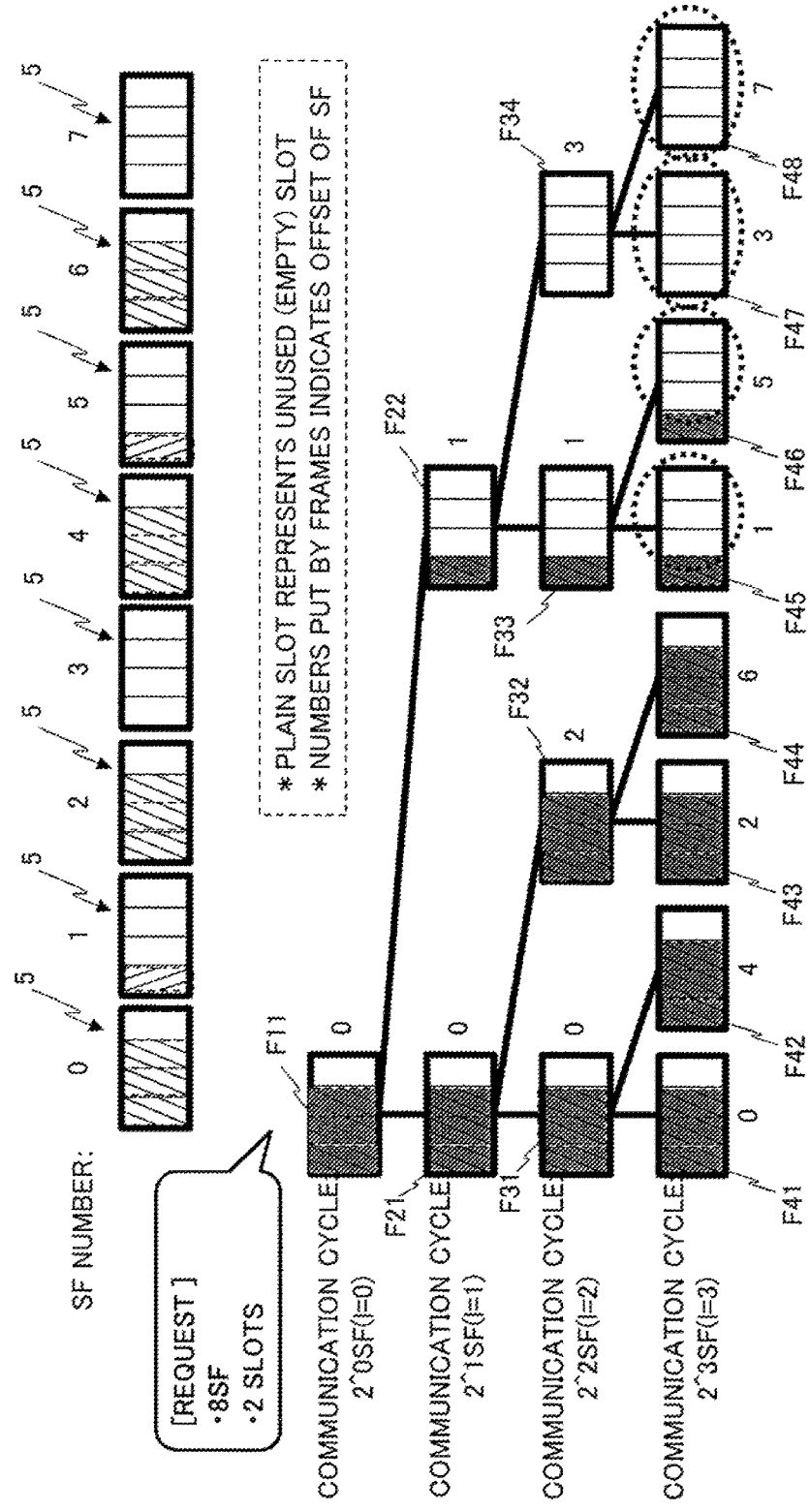
FIG. 11 is a diagram of a time slot assignment method using a hierarchical structure according to an embodiment.

As illustrated in FIG. 11, furthermore, a case where a connection request in which a communication cycle is 8 SFs and a bandwidth is 2 slots is arrived from a terminal 2 (terminal (3)) to the base station 1 is assumed. In this case, the lowermost layer is referred to, and the frame F45, the frame F46, the frame F47 and the frame F48 are extracted as frames 5 that allow assignment of 2 slots for the request.

Figure 12:
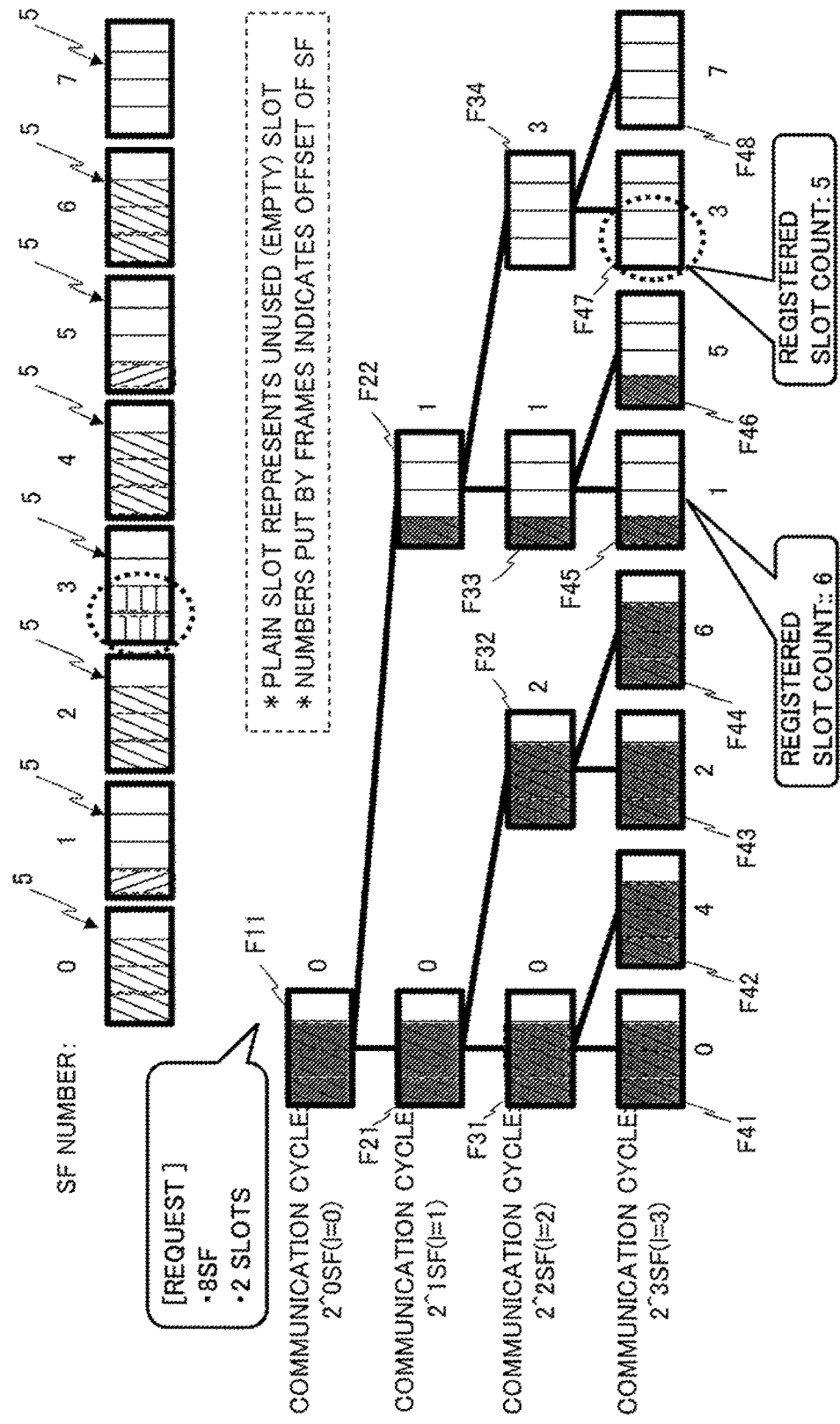
FIG. 12 is a diagram of a time slot assignment method using a hierarchical structure according to an embodiment.
Figure 13:
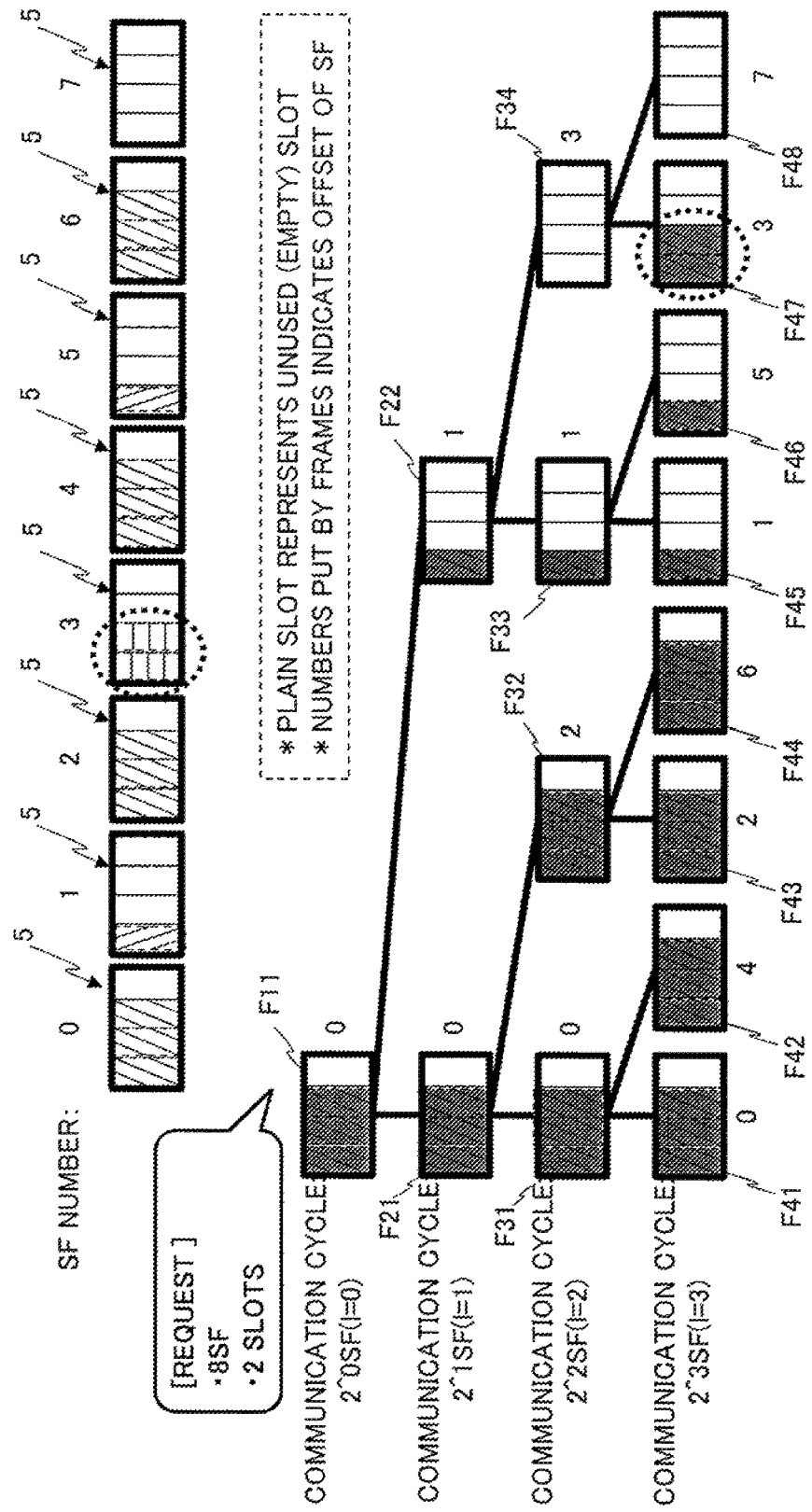
FIG. 13 is a diagram of a time slot assignment method using a hierarchical structure according to an embodiment.

As illustrated in FIG. 12, if the frame F45 is selected, six time slots 6 are registered as "used". On the other hand, if the frame F47 is selected, five time slots 6 are registered as "used". Therefore, determination is made to assign first and second time slots 6 in the frame F47 (frame number "3") (see FIG. 13).

Figure 14:
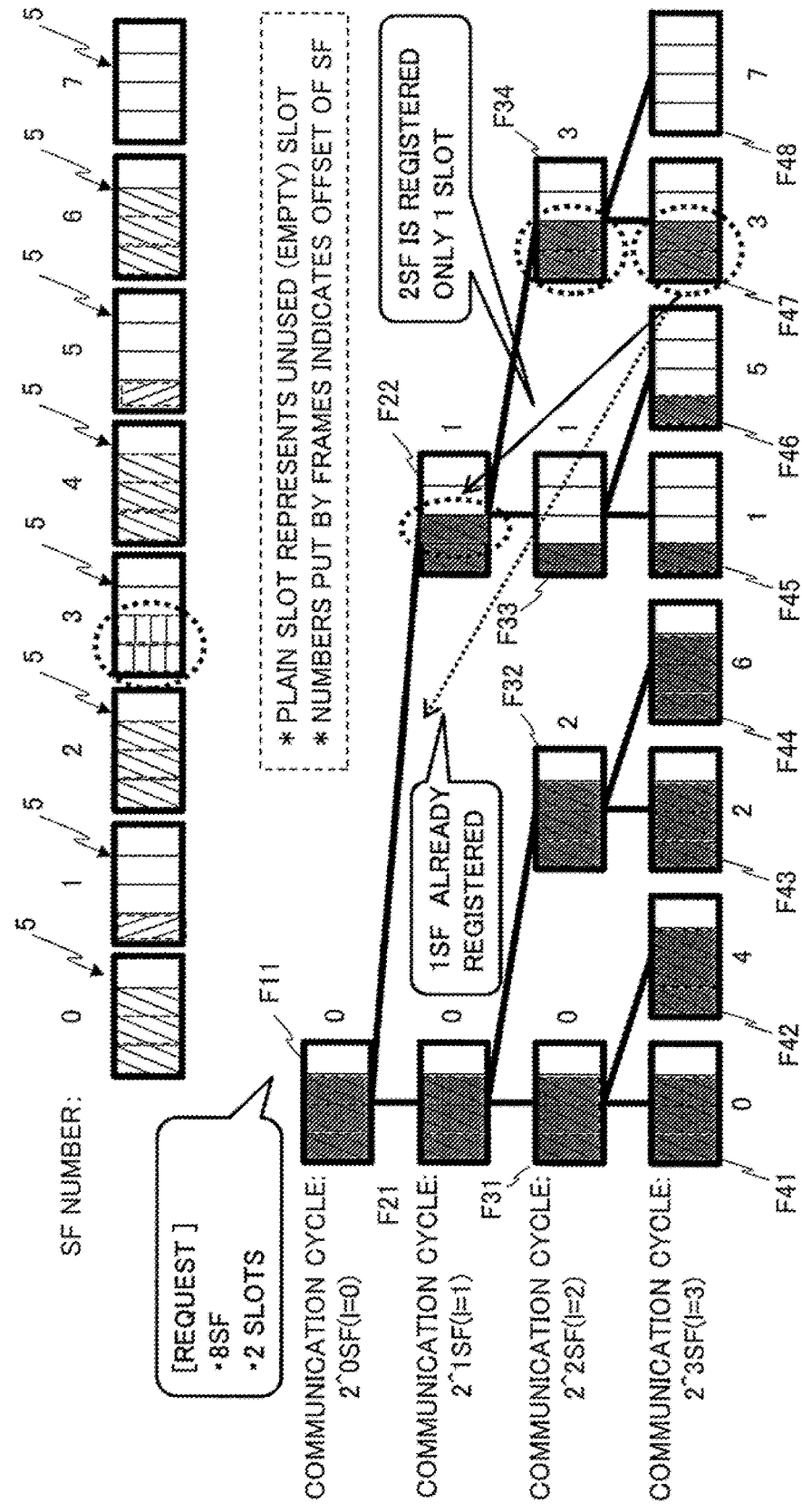
FIG. 14 is a diagram of a time slot assignment method using a hierarchical structure according to an embodiment.

As illustrated in FIG. 14, the base station 1 sets the first and second time slots 6 in the frame F34 in an adjacent layer, the frame F34 being linked with the frame F47, and the second time slot 6 in the frame F22 in an adjacent layer, the frame F22 being linked with the frame F34, to "used". In this case, the first time slot 6 in the frame F22 is already "used" and thus no processing is performed for the time slot 6.

Figure 15:
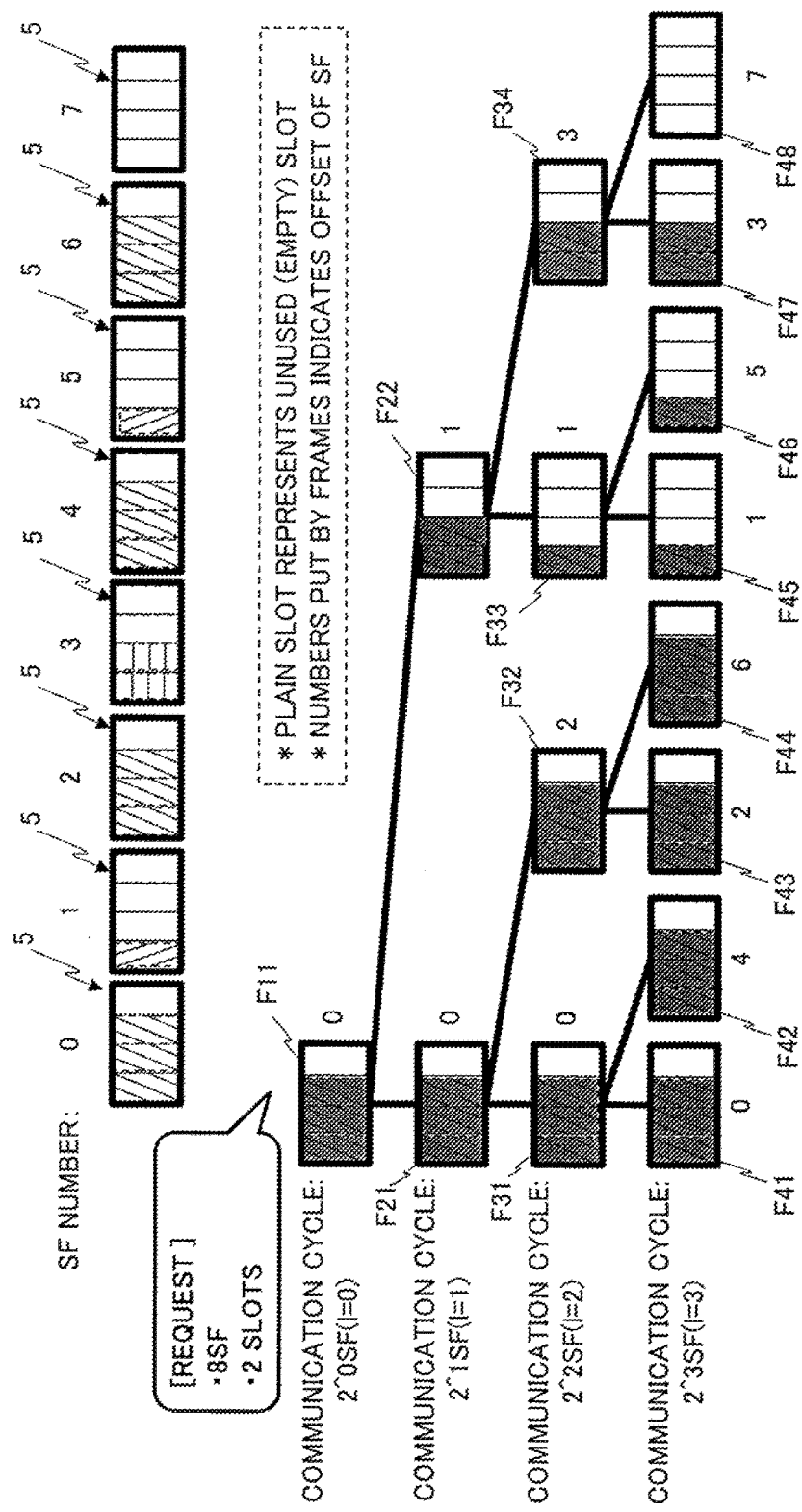
FIG. 15 is a diagram of a time slot assignment method using a hierarchical structure according to an embodiment.

A result of bandwidth assignment (periodic assignment of time slots 6 to the terminal (1), the terminal (2) and the terminal (3) is indicated in FIG. 15.

Figure 16:
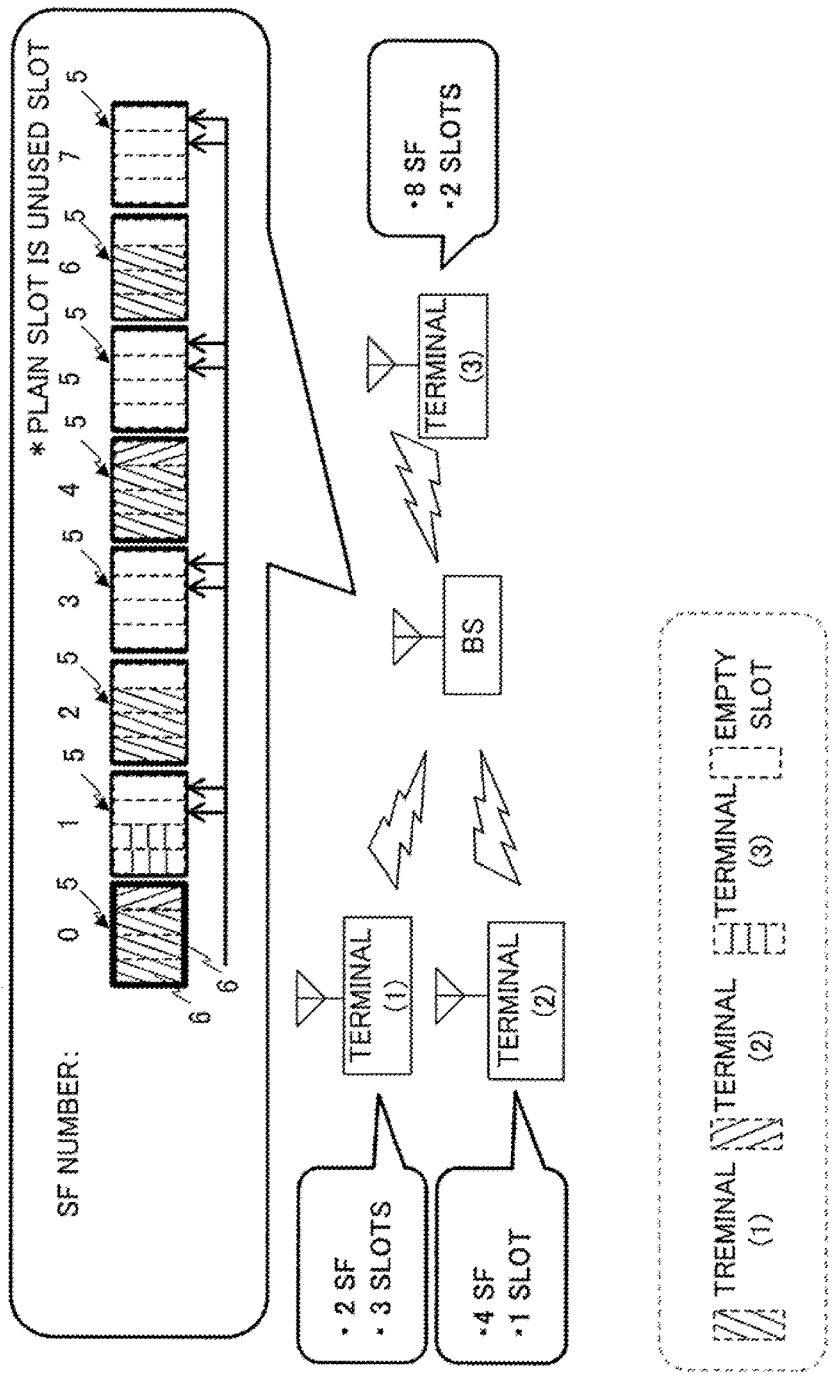
FIG. 16 is a diagram of a comparative example.

FIG. 16 is a diagram for description of the embodiment and a comparative example. The comparative example is the same as the embodiment in that a base station assigns time slots to each terminal. In the comparative example, bandwidth (time slot) assignment is performed in order from top in response to a request from a terminal.

Figure 17:
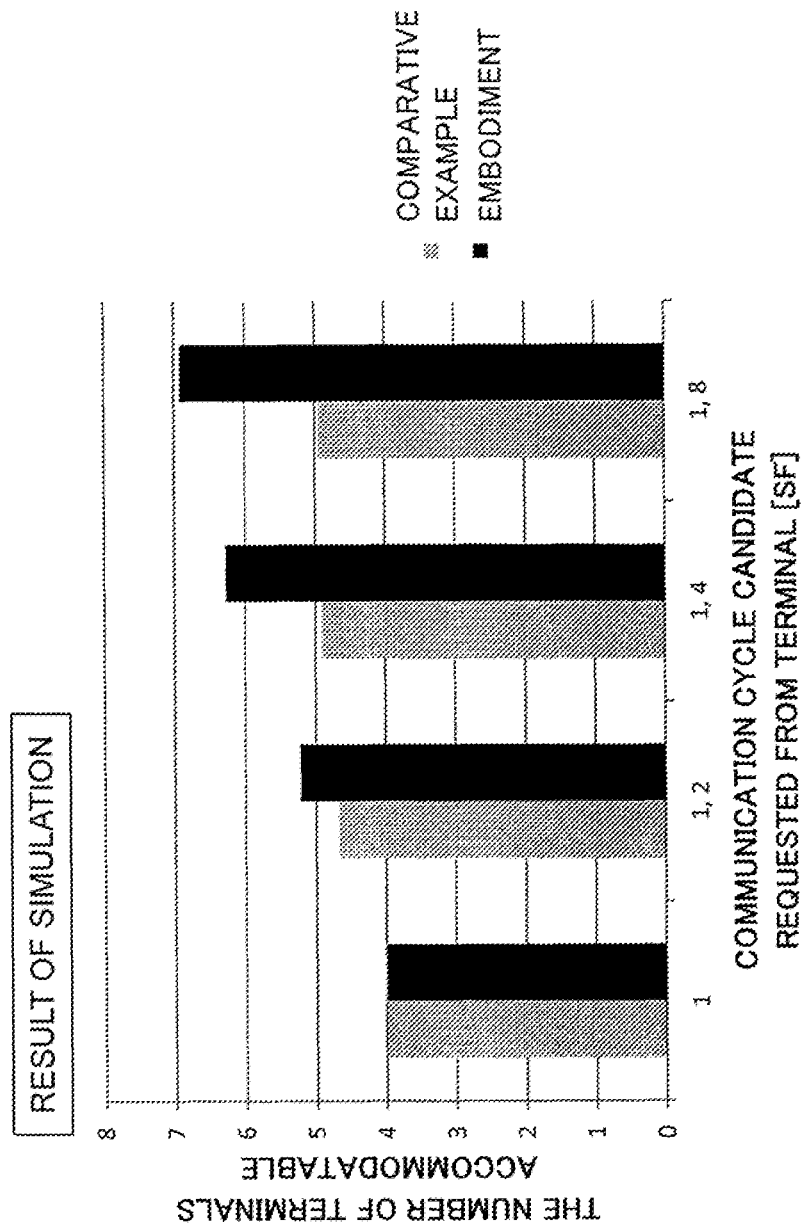
FIG. 17 illustrates simulation results relating to a comparison between an embodiment and a comparative example.

FIG. 17 indicates simulation results relating to a comparison between the embodiment and the comparative example. FIG. 17 indicates results of simulation of the number of terminals for which assignment is allowed (number of terminals allowed) until no further assignment according to a request from a terminal can be allowed.

Parameters used in the simulation are as follows.

The base station can assign a maximum of four time slots for one SF.

A bandwidth requested by a terminal is one time slot.

A communication cycle requested by a terminal is randomly selected from communication cycle candidates (plurality of communication cycles).

With the simulation result as the X axis, a case where the communication cycle is 1 SF, a case where the communication cycle is 1 SF or 2 SFs, a case where the communication cycle is 1 SF or 4 SFs, and a case where the communication cycle is 1 SF or 8 SFs are indicated. In the simulation results, the left-side bars indicate the comparative example, and the right-side bars indicate the embodiment.

From the simulation results, it can be understood that where there are plural types of communication cycle candidates, the embodiment provides an effect of an increase in number of terminals allowed. In particular, it has been found that the effect is large where there is a large difference in value between communication cycle candidates (difference in number of SFs is large). In the example in FIG. 17, the effect is largest where the communication cycle is 1 SF or 8 SFs, which exhibits an 39.9% increase in number of terminals allowed.

Figure 18:
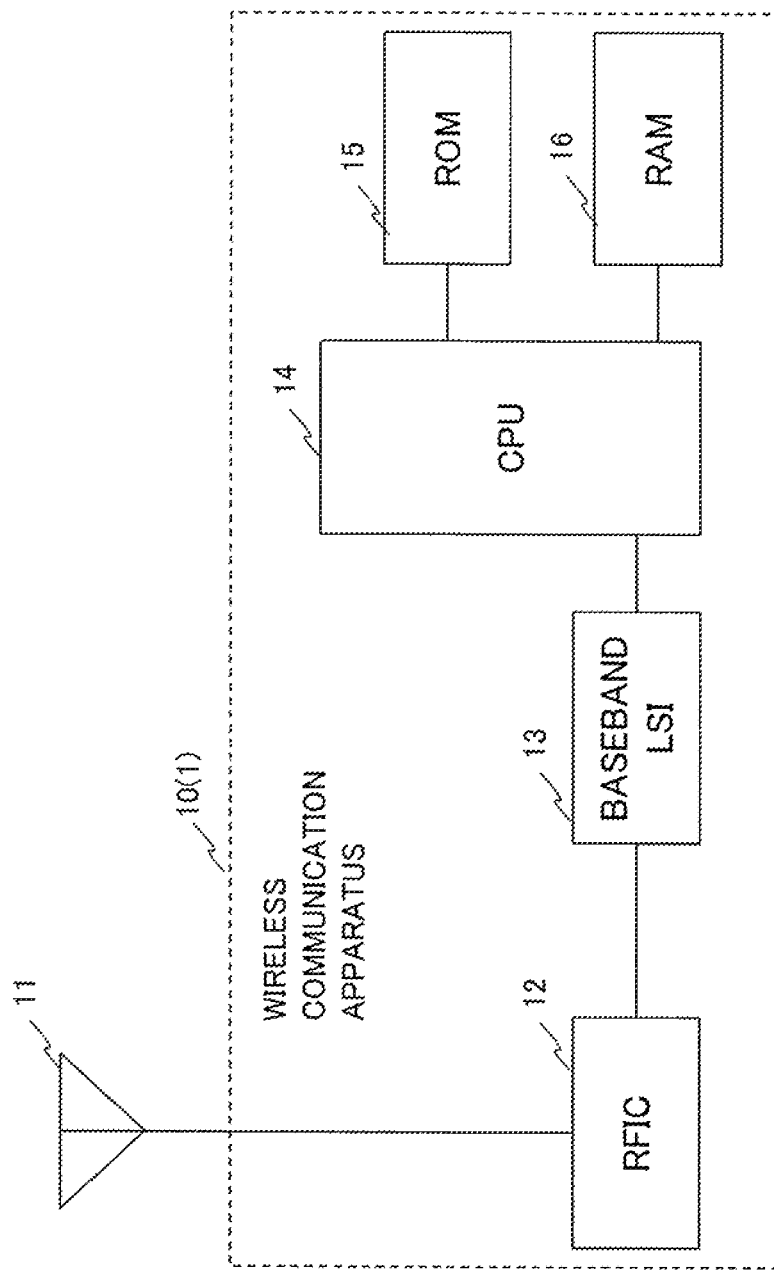
FIG. 18 is a diagram illustrating an example hardware configuration of a wireless communication apparatus that can be as a base station.

FIG. 18 is a diagram illustrating an example hardware configuration of a wireless communication apparatus (computer) that can be used as the base station 1. In FIG. 18, a wireless communication apparatus 10 includes an antenna 11, an RFIC (radio-frequency integrated circuit) 12 connected to the antenna 11, and a baseband LSI (large-scale integrated circuit) 13 connected to the RFIC 12. The wireless communication apparatus 10 further includes a CPU (central processing unit) 14 connected to the baseband LSI 13, and a ROM (read-only memory) 15 and a RAM (random access memory) 16 each connected to the CPU 14.

The antenna 11 transmits/receives a wireless signal (radio wave). The RFIC 12 is a circuit that performs conversion between a baseband signal and a radio-frequency signal (wireless signal). The baseband LSI 13 performs conversion between a baseband signal and a digital signal (data) by means of modulation/demodulation processing.

The ROM 15 stores computer programs to be executed by the CPU 14 and data used in execution of the programs. The RAM 16 is used as, e.g., a work area for the CPU 14, a storage area for the programs and data and a buffer area for communication data.

The CPU 14 loads the programs stored in the ROM 15 into the RAM 16 and executes the programs and thereby causes the wireless communication apparatus 10 to operate as the base station 1. Here, the CPU 14 performs processing for bandwidth (time slot) assignment in response to a request from a terminal 2 and assignment status management (bandwidth search, bandwidth assignment and bandwidth registration processing) such as described with reference to FIGS. 3 to 15.

Here, the CPU 14 is an example of "control device", "controller" or "processor". The RAM 16 and the ROM 15 are examples of "storage device", "memory" or "storage medium". As a storage device, the wireless communication apparatus 10 may include, for example, an auxiliary storage device such as a hard disk drive (HDD), a solid state drive (SSD), a flash memory or an electrically erasable programmable read-only memory (EEPROM).

The CPU 14 may be another processor such as a DSP. The processing to be performed by the CPU 14 may be performed by a plurality of CPUs or a CPU having a multi-core configuration. Also, the processing to be performed by the CPU 14 may be performed by a hardware logic using an electric/electronic circuit or an integrated circuit. Examples of the integrated circuit include a programmable logic device (PLD) such as a field programmable gate array (FPGA) and an application-specific integrated circuit (ASIC). Also, the processing to be performed by the CPU 14 may be performed by a chip including a CPU and a peripheral circuit. Such chip is called, e.g., a system LSI, a SoC (system-on-a-chip) or a MPU (micro controller unit).

Also, each terminal 2 can have the hardware configuration illustrated in FIG. 18, and a CPU 14 can generate a connection request such as described above by means of execution of the CPU 14 and transmits the connection request to the base station 1 via a baseband LSI 13, an RFIC 12 and an antenna 11.

Figure 19:
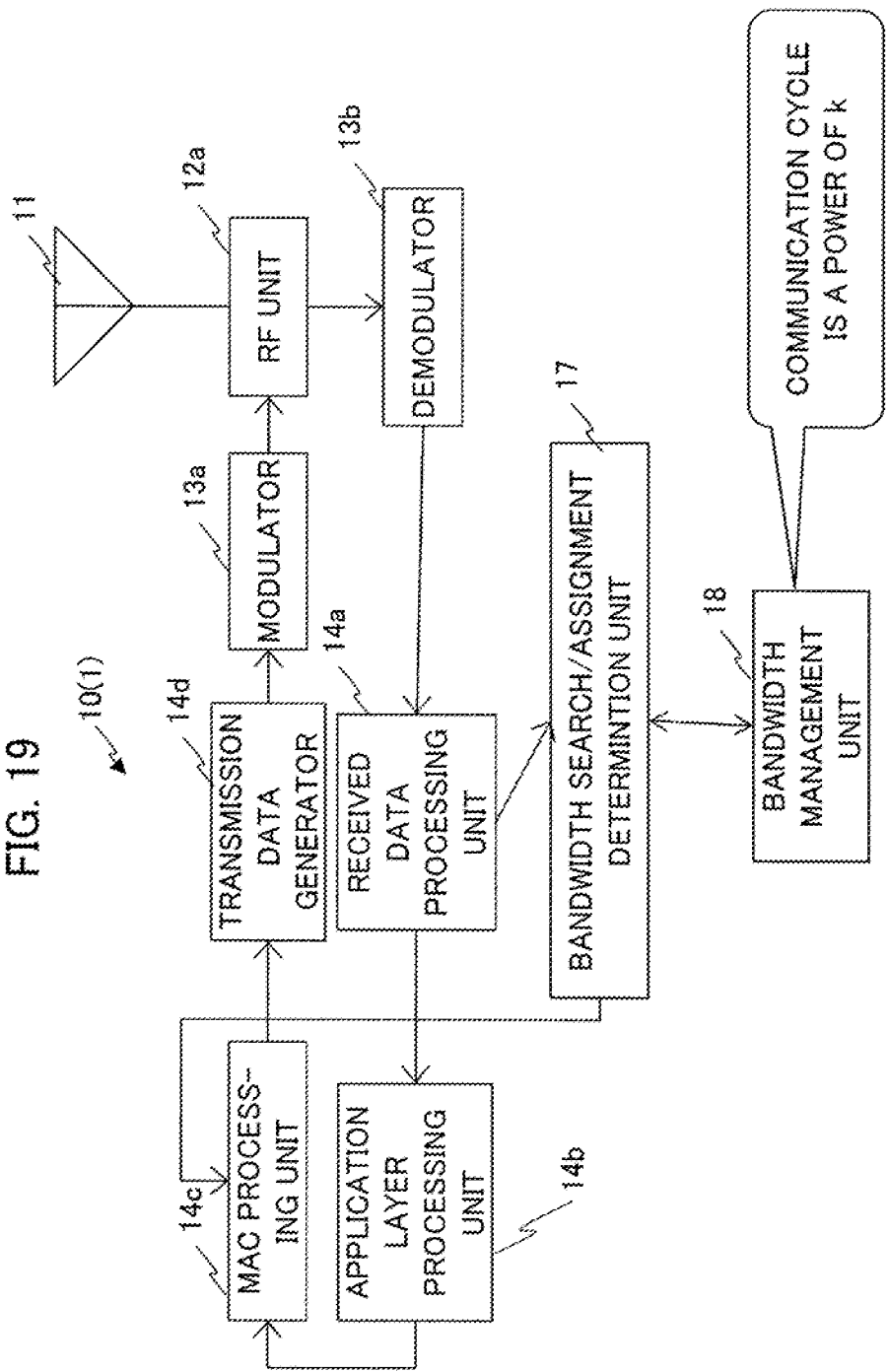
FIG. 19 schematically illustrates functions a wireless communication apparatus operating as a base station has.

FIG. 19 schematically illustrates functions the wireless communication apparatus 10 operating as the base station 1 has. The wireless communication apparatus 10 operates as an apparatus including the antenna 11, an RF unit 12*a*, a modulation unit 13*a*, a demodulation unit 13*b*, a receive data processing unit 14*a*, an application layer processing unit 14*b*, a MAC (media access control) processing unit 14*c* and a transmit data generation unit 14*d*. The wireless communication apparatus 10 further operates as an apparatus including a bandwidth search/assignment determination unit 17 and a bandwidth management unit 18. The bandwidth search/assignment determination unit 17 is an example of "assignment unit", and the bandwidth management unit 18 is an example of "management unit".

The RF unit 12*a* is a function of the RFIC 12 illustrated in FIG. 18. The demodulation unit 13*b* and the modulation unit 13*a* are functions the baseband LSI 13 has. The receive data processing unit 14*a*, the application layer processing unit 14*b*, the MAC processing unit 14*c*, the transmit data generation unit 14*d* and the bandwidth search/assignment determination unit 17 are functions provided as a result of execution of a program by the CPU 14. The bandwidth management unit 18 is formed on, for example, the RAM 16.

The RF unit 12*a* performs conversion between a baseband signal and a wireless signal. The antenna 11 transmits/receives a wireless signal. The demodulation unit 13*b* demodulates the baseband signal from the RF unit 12*a* to obtain a digital signal (data). The receive data processing unit 14*a* performs processing of the data (receive data) obtained as a result of the demodulation, according to the program. For example, the receive data processing unit 14*a* determines whether or not the receive data is a connection request from a terminal 2, and if the receive data is a connection request, delivers the connection request to the bandwidth search/assignment determination unit 17.

The application layer processing unit 14*b* performs processing relating to an application layer. The MAC processing unit 14*c* performs processing for a MAC layer. The transmit data generation unit generates transmit data (digital signal) using data from the MAC processing unit 14*c*. The modulation unit 13*a* supplies a baseband signal obtained by modulation of the digital signal, to the RF unit 12*a*.

FIG. 20 is an example configuration of the hierarchical structure managed by the bandwidth management unit 18. The bandwidth management unit 18 forms a plurality of storage areas 19 each indicating a time slot use status (assignment status) of a relevant one of the frames 5 forming the above-described hierarchical structure, on the RAM 16. Each storage area 19 includes a flag area 20 for each of the time slots 6 forming the relevant frame 5.

For example, as illustrated in FIG. 20, where the hierarchical structure is formed of 15 frames 5 indicated by the circled numbers of 1 to 15, the bandwidth management unit 18 forms a storage area 19 for each of the 15 frames. The bandwidth management unit 18 sets a binary value (for example, unused: 0, used: 1) in each flag area 20 of each storage area 19 according to whether the relevant time slot is unused or used (unassigned or assigned).

Figure 21:
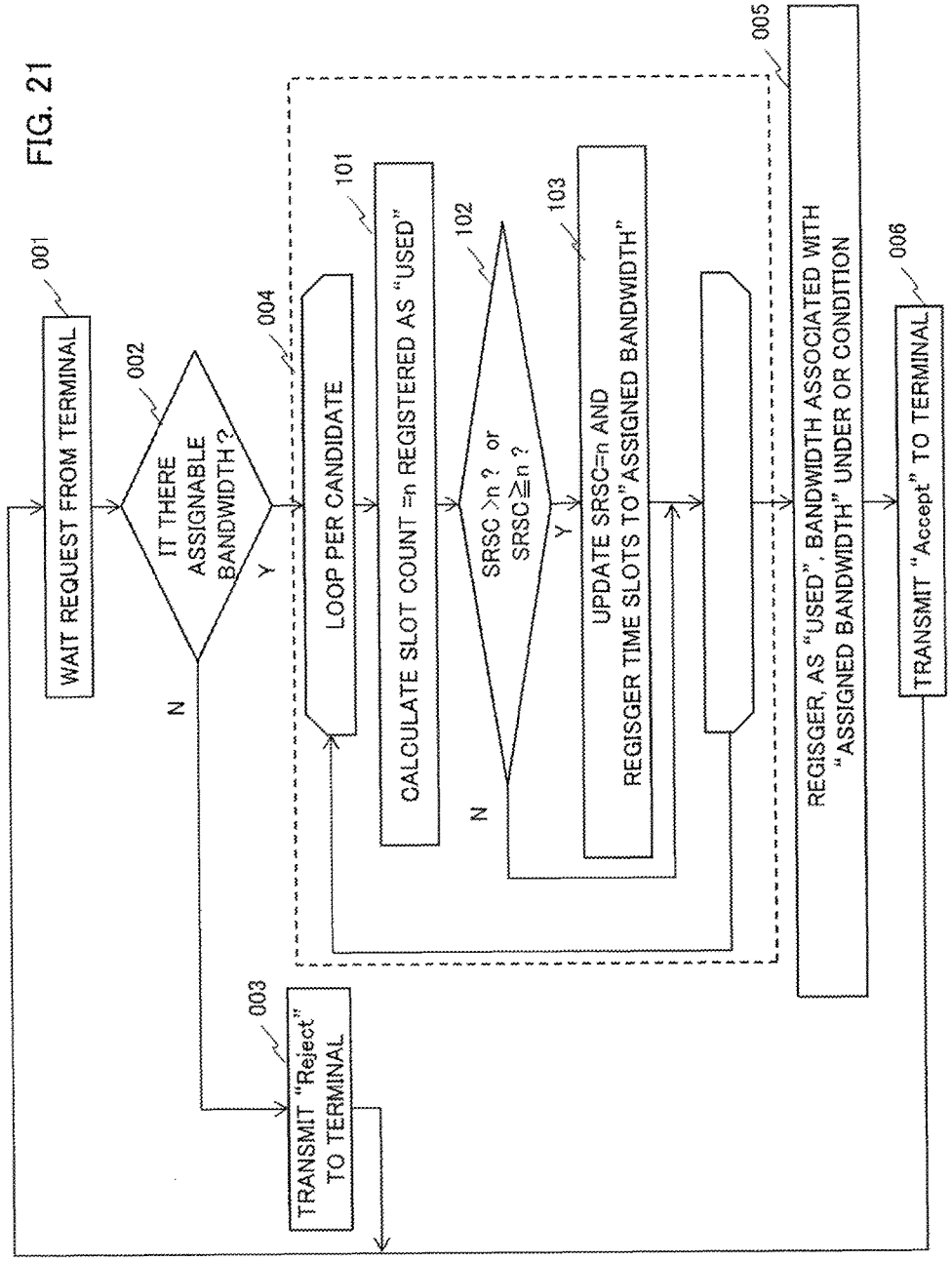
FIG. 21 is a flowchart illustrating an example of processing in a bandwidth search/assignment determination unit.

FIG. 21 is a flowchart illustrating an example of processing in the bandwidth search/assignment determination unit 17. The processing illustrated in FIG. 21 is performed by the CPU 14. In processing in 001, the CPU 14 waits until arrival of a bandwidth request (connection request) from a terminal 2.

In the processing in 002, the CPU 14 that has received a connection request refers to the bandwidth management unit 18 and determines whether or not there is an assignable bandwidth (time slots) (bandwidth search). Here, if there is no such bandwidth, a rejection is provided to the request source terminal 2 (003).

On the other hand, if there is an assignable bandwidth, the CPU 14 performs processing for bandwidth assignment. In the bandwidth assignment processing, the following processing is performed for each of the assignable bandwidth candidates (selection patterns (groups)).

In the processing in 101, the count of slots to be registered as "used" in the flag areas 20=n is calculated. The processing in 101 is processing for counting the registered slots such as described with reference to FIG. 8.

In 102, whether or not the slot count n obtained as a result of the processing in 101 is equal to or smaller than a "smallest registered slot count" is determined. In other words, each time the processing in 101 to 103 is performed, a provisional "smallest registered slot count" is retained, and when the slot count n is calculated in the processing in 101, the slot count n is compared with the provisional "smallest registered slot count" in 102. As a result of the comparison, if the slot count n is equal to or smaller than the provisional value, the CPU 14 performs processing for updating the "smallest registered slot count" and registering time slots meeting the request as "assigned bandwidth" in the processing in 103 (see FIG. 9). If the slot count n is larger than the provisional value, no assignment of the candidate is performed.

In the processing in 005, the CPU 14 registers the assigned bandwidth (selected frame) and frames linked with the assigned bandwidth (selected frame) as "used" in the OR condition (see FIG. 10). In other words, the CPU 14 sets "1" in the corresponding flag areas 20.

As described above, the embodiment enables an increase in number of allowed terminals by efficient assignment of bandwidths (time slots) to the terminals 2.

Although the embodiment has been described in terms of an example in which the base station 1, which is a wireless communication apparatus, manages time slot assignment, an apparatus other than the base station 1 may perform the assignment for the terminals 2 (communication apparatuses) described in the embodiment. Also, although the embodiment has been described in terms of time slot assignment where wireless communication is performed between the base station 1 and the terminals 2, the configuration of the embodiment may be employed where TDMA is performed between wired communication apparatuses. Also, the assignment management apparatus may be an apparatus that performs assignment management and is independent from communication entities such the base station 1 and the terminals 2. The above-described configurations of the embodiment may arbitrarily be combined.

According to the above-described embodiments, it is possible to provide an apparatus and a method for allocating time slots to increase the number of communication apparatuses connected.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An assignment management apparatus for assigning a time slot in a frame corresponding to any of a plurality of communication cycles, for communication for a communication apparatus, the frame being included in a plurality of frames resulting from division of time, the plurality of frames each having a predetermined length and each being divided into a plurality of time slots each having a predetermined length, the apparatus comprising:
   a memory; and
   a processor configured to perform a process by executing a program stored in the memory, the process including:
      managing the plurality of frames using a hierarchical structure meeting (i) to (iii) below,
      (i) including layers corresponding to the plurality of communication cycles each being a power of an integer k,
      (ii) in each layer, one or more frames that can be selected from the plurality of frames according to a communication cycle corresponding to the layer are grouped, one frame in each group is managed, and a use status of a time slot in the one frame is managed, and
      (iii) if a frame managed in a certain layer is managed in a layer other than the certain layer and if a frame belonging to a group to which a frame managed in the certain layer belongs managed in a layer other than the certain layer, the frame managed in the layer other than the certain layer is associated with the frame in the certain layer as an associated frame; and
   when a predetermined number of time slots in one of the plurality of communication cycles is assigned to the communication apparatus in response to a request, refers to the hierarchical structure;
   identifying an associated frame whose use status is to be changed to used by the assignment of the predetermined number of time slots for a group managed in a layer corresponding to the requested communication cycle; and
   making determination to assign a frame belonging to a group in which a number of time slots, in the associated frame, whose use status is changed to used is smaller, to the communication apparatus.

2. The assignment management apparatus according to claim 1, wherein the processor sets a time slot in an empty state in the one frame in the group determined to be assigned to the communication apparatus, and a use status of a time slot in the associated frame, the time slot being in an empty state and corresponding to the time slot in the one frame in the group, to used.

3. An assignment management method of assigning a time slot in a frame corresponding to any of a plurality of communication cycles, for communication for a communication apparatus, the frame being included in a plurality of frames resulting from division of time, the plurality of frames each having a predetermined length and each being divided into a plurality of time slots each having a predetermined length, the method comprising:

managing, using a processor, the plurality of frames using a hierarchical structure meeting (i) to (iii) below,
(i) including layers corresponding to the plurality of communication cycles each being a power of an integer k,
(ii) in each layer, one or more frames that can be selected from the plurality of frames according to a communication cycle corresponding to the layer are grouped, one frame in each group is managed, and a use status of a time slot in the one frame is managed, and
(iii) if a frame managed in a certain layer is managed in a layer other than the certain layer and if a frame belonging to a group to which a frame managed in the certain layer belongs managed in a layer other than the certain layer, the frame managed in the layer other than the certain layer is associated with the frame in the certain layer as an associated frame;
when a predetermined number of time slots in one of the plurality of communication cycles is assigned to the communication apparatus in response to a request, referring, using the processor, to the hierarchical structure;
identifying, using the processor, an associated frame whose use status is to be changed to used by the assignment of the predetermined number of time slots for a group managed in a layer corresponding to the requested communication cycle: and
making determination to assign a frame belonging to a group in which a number of time slots, in the associated frame, whose use status is changed to used is smaller, to the communication apparatus.

4. A non-transitory computer-readable recording medium having stored therein a program for causing a computer that operates as an assignment management apparatus for assigning a time slot in a frame corresponding to any of a plurality of communication cycles, for communication for a communication apparatus, the frame being included in a plurality of frames resulting from division of time, the plurality of frames each having a predetermined length and each being divided into a plurality of time slots each having a predetermined length, the program for causing the computer to execute a process comprising:
managing the plurality of frames using a hierarchical structure meeting (i) to (iii) below,
(i) including layers corresponding to the plurality of communication cycles each being a power of an integer k,
(ii) in each layer, one or more frames that can be selected from the plurality of frames according to a communication cycle corresponding to the layer are grouped, one frame in each group is managed, and a use status of a time slot in the one frame is managed, and
(iii) if a frame managed in a certain layer is managed in a layer other than the certain layer and if a frame belonging to a group to which a frame managed in the certain layer belongs managed in a layer other than the certain layer, the frame managed in the layer other than the certain layer is associated with the frame in the certain layer as an associated frame;
when a predetermined number of time slots in one of the plurality of communication cycles is assigned to the communication apparatus in response to a request, referring to the hierarchical structure;
identifying an associated frame whose use status is to be changed to used by the assignment of the predetermined number of time slots for a group managed in a layer corresponding to the requested communication cycle; and making determination to assign a frame belonging to a group in which a number of time slots, in the associated frame, whose use status is changed to used is smaller, to the communication apparatus.

* * * * *